(12) United States Patent
Schäfer

(10) Patent No.: US 11,138,425 B2
(45) Date of Patent: Oct. 5, 2021

(54) NAMED ENTITY RECOGNITION WITH CONVOLUTIONAL NETWORKS

(71) Applicant: LEVERTON HOLDING LLC, Solon, OH (US)

(72) Inventor: Christian Schäfer, Berlin (DE)

(73) Assignee: LEVERTON HOLDING LLC, Solon, OH (US)

( * ) Notice: Subject to any disclaimer, the term of this patent is extended or adjusted under 35 U.S.C. 154(b) by 90 days.

(21) Appl. No.: 16/582,351

(22) Filed: Sep. 25, 2019

(65) Prior Publication Data

US 2020/0097718 A1 Mar. 26, 2020

Related U.S. Application Data

(60) Provisional application No. 62/736,922, filed on Sep. 26, 2018.

(51) Int. Cl.
*G06K 9/00* (2006.01)
*G06N 3/04* (2006.01)
(Continued)

(52) U.S. Cl.
CPC ..... *G06K 9/00469* (2013.01); *G06K 9/00449* (2013.01); *G06K 9/00463* (2013.01);
(Continued)

(58) Field of Classification Search
CPC .......... G06K 9/00442; G06K 9/00449; G06K 9/00463; G06K 9/00469; G06K 9/468; G06K 9/4685; G06T 2207/30176
See application file for complete search history.

(56) References Cited

U.S. PATENT DOCUMENTS

| 9,424,249 B1 | 8/2016 | Grigsby et al. ..... G06F 17/2785 |
| 2002/0022956 A1* | 2/2002 | Ukrainczyk et al. ........ |
| | | G06F 16/353 |
| | | 704/9 |

(Continued)

FOREIGN PATENT DOCUMENTS

EP  3136257 A2  3/2017  ............. G06F 17/27

OTHER PUBLICATIONS

International Search Report and Written Opinion dated Dec. 18, 2019 issued for International PCT Application No. PCT/US2019/052906 filed Sep. 25, 2019.

(Continued)

*Primary Examiner* — Andrew W Johns
(74) *Attorney, Agent, or Firm* — K&L Gates LLP

(57) ABSTRACT

Methods and systems for recognizing named entities within the text of a document are provided. The methods and systems may include receiving a document image and recognized text of the document image. A feature map of the document image may be created, a tagged map may be created, and locations of tags within the tagged map may be estimated using a machine learning model. Named entities with the recognized text may be recognized based on the one or more locations of the tags. In some embodiments, the machine learning model is a convolutional neural network. In further embodiments, creating the feature map may include determining, for a subset of the cells of the feature map, one or more features of the recognized text contained in a corresponding portion of the document image.

20 Claims, 7 Drawing Sheets

(51) Int. Cl.
*G06N 3/08* (2006.01)
*G06K 9/62* (2006.01)

(52) U.S. Cl.
CPC ......... *G06K 9/6256* (2013.01); *G06K 9/6262* (2013.01); *G06N 3/04* (2013.01); *G06N 3/08* (2013.01); *G06K 2209/01* (2013.01)

(56) References Cited

U.S. PATENT DOCUMENTS

| | | | |
|---|---|---|---|
| 2003/0058474 A1* | 3/2003 | Loce et al. ......... | G06K 15/1807 358/2.1 |
| 2009/0016615 A1 | 1/2009 | Hull et al. ................... | 382/217 |
| 2017/0091580 A1 | 3/2017 | Song et al. .......... | G06K 9/4671 |
| 2018/0293438 A1* | 10/2018 | Ortiz et al. ........... | G06F 16/583 |

OTHER PUBLICATIONS

Manish Chablani, "YOLO—You only look once, real time object detection explained", Aug. 21, 2017, https://towardsdatascience.com/yolo-you-only-look-once-real-time-object-detection-explained-492dc9230006?gi=893a22ddd32f.

* cited by examiner

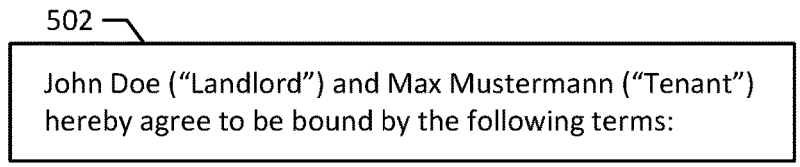
Fig. 5A
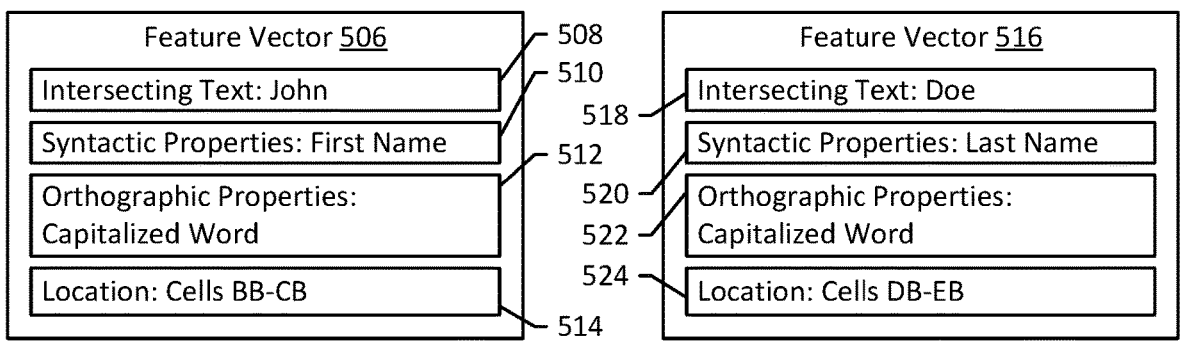
Fig. 5B
Fig. 5C   Fig. 5D
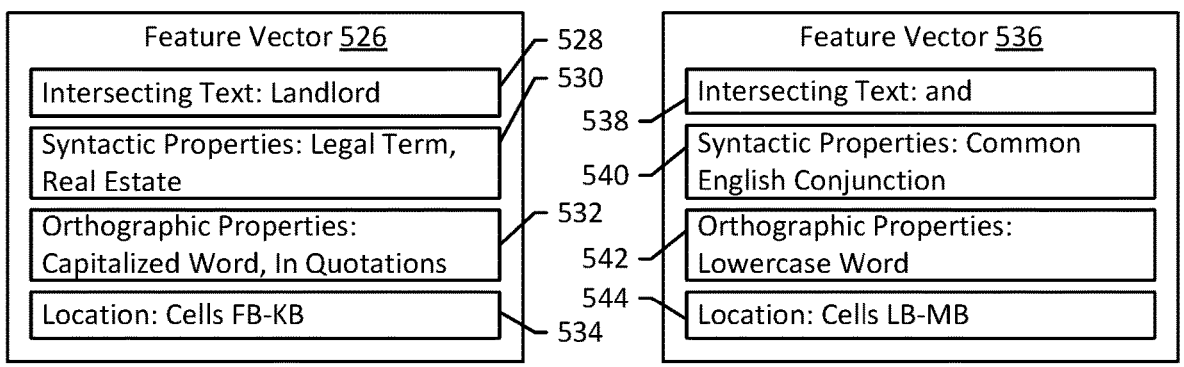
Fig. 5E   Fig. 5F

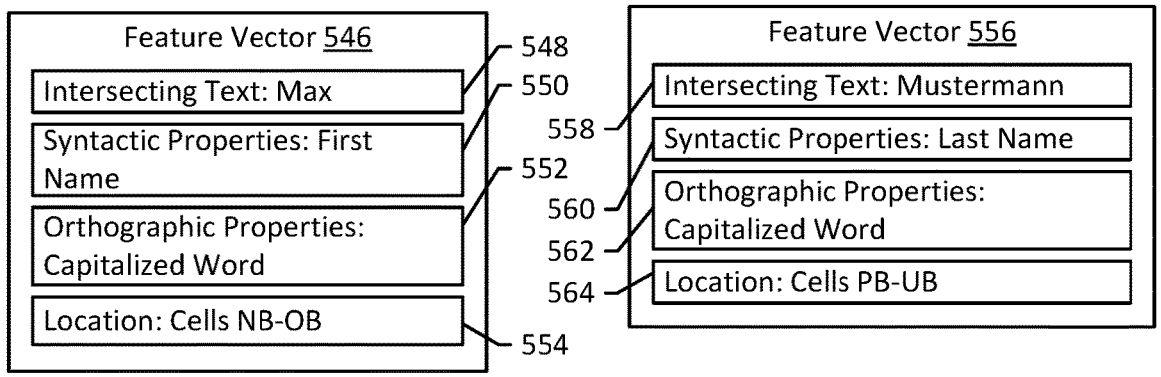
Fig. 5G    Fig. 5H
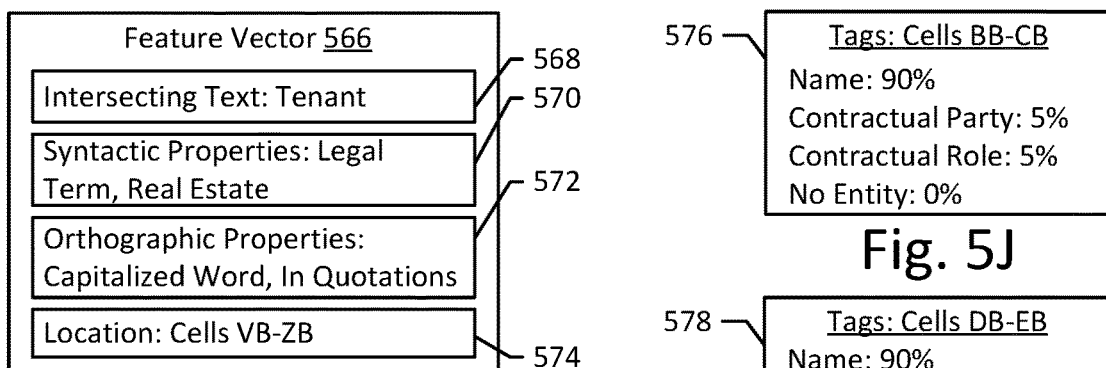
Fig. 5I
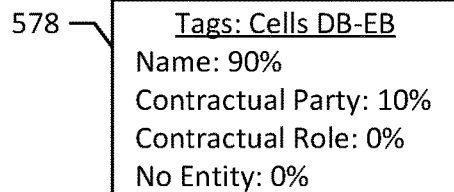
Fig. 5J
Fig. 5K
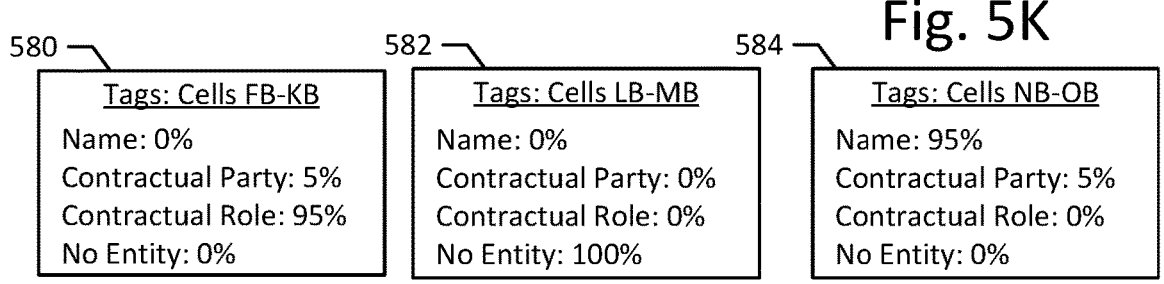
Fig. 5L    Fig. 5M    Fig. 5N
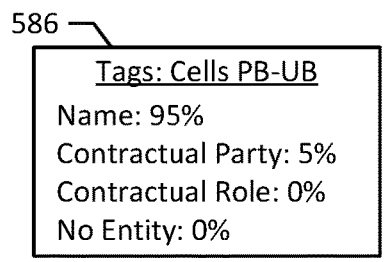
Fig. 5O
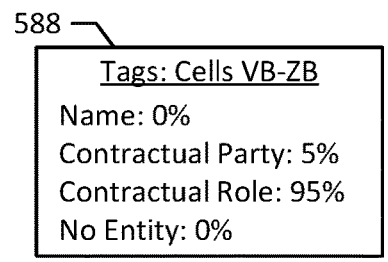
Fig. 5P

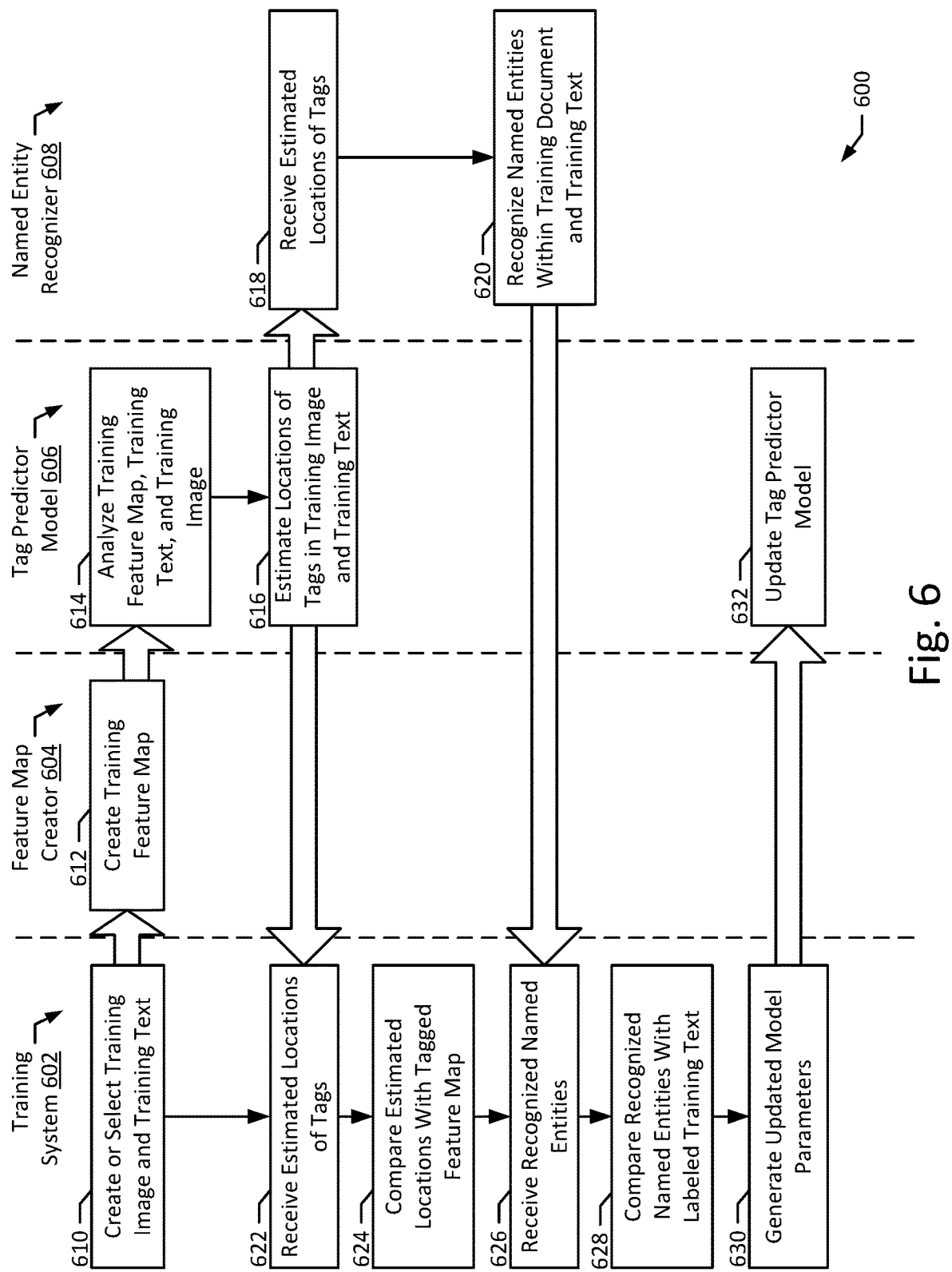

NAMED ENTITY RECOGNITION WITH CONVOLUTIONAL NETWORKS

CROSS-REFERENCE TO RELATED APPLICATIONS

The present application claims priority to U.S. Provisional Application No. 62/736,922 filed on Sep. 26, 2018, the disclosure of which is incorporated herein by reference for all purposes.

BACKGROUND

Many automatic document processing systems scan documents in as document images or store them as a text. These systems may also recognize the text contained within document images using optical character recognition (OCR). By recognizing the text of the document image, the document processing system may be able to perform further analysis. For example, some documents may contain entities that are important to understanding the document. Therefore, after recognizing the text of the document image, some document processing systems also attempt to identify named entities within the text.

SUMMARY

The present disclosure presents new and innovative systems and methods for recognizing named entities within documents. In a first aspect, a method is provided comprising receiving a document image and a recognized text of the document image, creating a feature map of the document image comprising one or more features of the recognized text, creating a tagged map including one or more tagged cells, estimating, with a machine learning model, one or more locations of a tag in the tagged map, and recognizing one or more named entities within the recognized text based on the one or more locations of the tag.

In a second aspect according to the first aspect, the machine learning model is a convolutional neural network.

In a third aspect according to the first and/or second aspects, creating the feature map includes creating the feature map comprising a grid with a plurality of cells, wherein a subset of the cells correspond to portions of the document image and determining, for the subset of the cells of the feature map, one or more features of the recognized text contained in the corresponding portion of the document image.

In a fourth aspect according to the third aspect, the grid contains M rows, and wherein M is less than the vertical resolution of the document image.

In fifth aspect according to the third and/or fourth aspects, the grid contains N columns, and wherein N is less than the horizontal resolution of the document image.

In sixth aspect according to the first through fifth aspects, the features include a recognized word of the recognized text that intersects a section of the document image, a text feature, and a spatial feature.

In a seventh aspect according to the sixth aspect, the text feature includes a feature selected from the group consisting of syntactical properties of the recognized word and orthographic properties of the recognized word, and the spatial feature includes a feature selected from the group consisting of a location of a recognized word and a boundary of the recognized word.

In an eighth aspect according to any of the first through seventh aspects, estimating the location of one or more predicted tags in the feature map further comprises estimating a probability that one or more of the tagged cells correspond to a portion of the document that contains the tag.

In a ninth aspect according to any of the first through eighth aspects, the recognized text includes a tabular text formatted in a table within the document image, and wherein at least one of the one or more named entities is recognized in the tabular text.

In a tenth aspect according to any of the first through ninth aspects, the recognized text includes a nested texted formatted to be nested beneath another portion of the recognized text, and wherein at least one of the one or more named entities is recognized in the nested text.

In an eleventh aspect according to any of the first through tenth aspects, the document image depicts multiple pages of a document.

In a twelfth aspect according to any of the first through eleventh aspects, the tagged map and the feature map have the same number of rows and columns.

In a thirteenth aspect according to any of the first through twelfth aspects, the method further comprises receiving (i) a training document image, (ii) a training text recognized from the training document image, (iii) a training feature map associated with the training image document, (iv) a labeled tagged map indicating one or more locations of the tag within the training feature map; and (v) a labeled training text indicating one or more named entities located within the training text. The method may further include estimating, with the machine learning model, one or more locations of a tag within a training tagged map, recognizing one or more named entities within the training text based on the training tagged map, and comparing the one or more locations of the tag within the training tagged map with the one or more locations of the tag within the labeled tagged map to identify one or more tag errors in the locations of the tag within the training tagged map. The method may also include comparing the one or more named entities recognized within the training text with the named entities indicated in the labeled training text to identify one or more named entity errors in the named entities recognized within the training text and updating one or more parameters of the machine learning model based on one or both of the tag errors and the named entity errors.

In a fourteenth aspect according to the thirteenth aspect, the machine learning model is initially configured to estimate tag locations in documents of a first document type and updating one or more parameters of the machine learning model enables the machine learning model to estimate tag locations in documents of a second document type.

In a fifteenth aspect according to the thirteenth and/or fourteenth aspects, updating one or more parameters of the machine learning model enables the machine learning model to estimate locations of a new tag.

In sixteenth aspect aspect, a system is provided comprising a processor and a document intake system comprising a feature map creator, a tag predictor, and a named entity recognizer. The document intake system may be configured, when executed by the processor, to receive a document image and a recognized text of the document image, create, with the feature map creator, a feature map of the document image comprising one or more features of the recognized text, create, with a tag predictor, a tagged map including one or more tagged cells, estimate, with a machine learning model, one or more locations of a tag in the tagged map and recognize, with a named entity recognizer, one or more named entities within the recognized text based on the one or more locations of the tag.

In a seventeenth aspect according to the sixteenth aspect, the machine learning model is a convolutional neural network.

In an eighteenth aspect according to the sixteenth and/or seventeenth aspects, the feature map creator is configured, when executed by the processor, to create the feature map comprising a grid with a plurality of cells, wherein a subset of the cells correspond to portions of the document image and determine, for the subset of the cells of the feature map, one or more features of the recognized text contained in the corresponding portion of the document image.

In a nineteenth aspect according to the eighteenth aspect, the grid contains M rows, and wherein M is less than the vertical resolution of the document image.

In a twentieth aspect according to the eighteenth and/or nineteenth aspects, the grid contains N columns, and wherein N is less than the horizontal resolution of the document image.

In a twenty-first aspect according to any of the sixteenth through twentieth aspects, the features include a recognized word of the recognized text that intersects a section of the document image, a text feature, and a spatial feature.

In a twenty-second aspect according to any of the sixteenth through twenty-first aspects, the text feature includes a feature selected from the group consisting of syntactical properties of the recognized word and orthographic properties of the recognized word, and the spatial feature includes a feature selected from the group consisting of a location of the recognized word and a boundary of the recognized word.

In a twenty-third aspect according to any of the sixteenth through twenty-second aspects, the tag predictor is configured, when executed by a processor, to estimate a probability that one or more of the tagged cells correspond to a portion of the document that contains the tag.

In a twenty-fourth aspect according to any of the sixteenth through twenty-third aspects, the recognized text includes a tabular text formatted in a table within the document image, and wherein at least one of the one or more named entities is recognized in the tabular text.

In a twenty-fifth aspect according to any of the sixteenth through twenty-fourth aspects, the recognized text includes a nested texted formatted to be nested beneath another portion of the recognized text, and wherein at least one of the one or more named entities is recognized in the nested text.

In a twenty-sixth aspect according to any of the sixteenth through twenty-fifth aspects, the document image depicts multiple pages of a document.

In a twenty-seventh aspect according to any of the sixteenth through twenty-sixth aspects, the tagged map and the feature map have the same number of rows and columns.

In a twenty-eighth aspect according to any of the sixteenth through twenty-seventh aspects, the system further comprises a training system configured, when executed by a processor, to receive (i) a training document image, (ii) a training text recognized from the training document image, (iii) a training feature map associated with the training image document, (iv) a labeled tagged map indicating one or more locations of the tag within the training feature map; and (v) a labeled training text indicating one or more named entities located within the training text. The training system may also be configured, when executed by the processor, to estimate, with the machine learning model, one or more locations of a tag within a training tagged map, recognize one or more named entities within the training text based on the training tagged map, compare the one or more locations of the tag within the training tagged map with the one or more locations of the tag within the labeled tagged map to identify one or more tag errors in the locations of the tag within the training tagged map, compare the one or more named entities recognized within the training text with the named entities indicated in the labeled training text to identify one or more named entity errors in the named entities recognized within the training text, and update one or more parameters of the machine learning model based on one or both of the tag errors and the named entity errors.

In a twenty-ninth aspect according to the twenty-eighth aspect, the machine learning model is initially configured to estimate tag locations in documents of a first document type and updating one or more parameters of the machine learning model enables the machine learning model to estimate tag locations in documents of a second document type.

In a thirtieth aspect according to the twenty-eighth and/or twenty-ninth aspects, updating one or more parameters of the machine learning model enables the machine learning model to estimate locations of a new tag.

In a thirty-first aspect, a computer-readable medium is provided, storing instructions which, when executed by one or more processors, cause the one or more processors to receive a document image and a recognized text of the document image, create a feature map of the document image comprising one or more features of the recognized text, create a tagged map including one or more tagged cells, estimate one or more locations of a tag in the tagged map, and recognize one or more named entities within the recognized text based on the one or more locations of the tag.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 5A to 5P illustrate an example named entity recognition procedure according to an exemplary embodiment of the present disclosure.

FIG. 6 illustrates a flow diagram of an example method according to an exemplary embodiment of the present disclosure.

DETAILED DESCRIPTION OF EXAMPLE EMBODIMENTS

Figure 1:
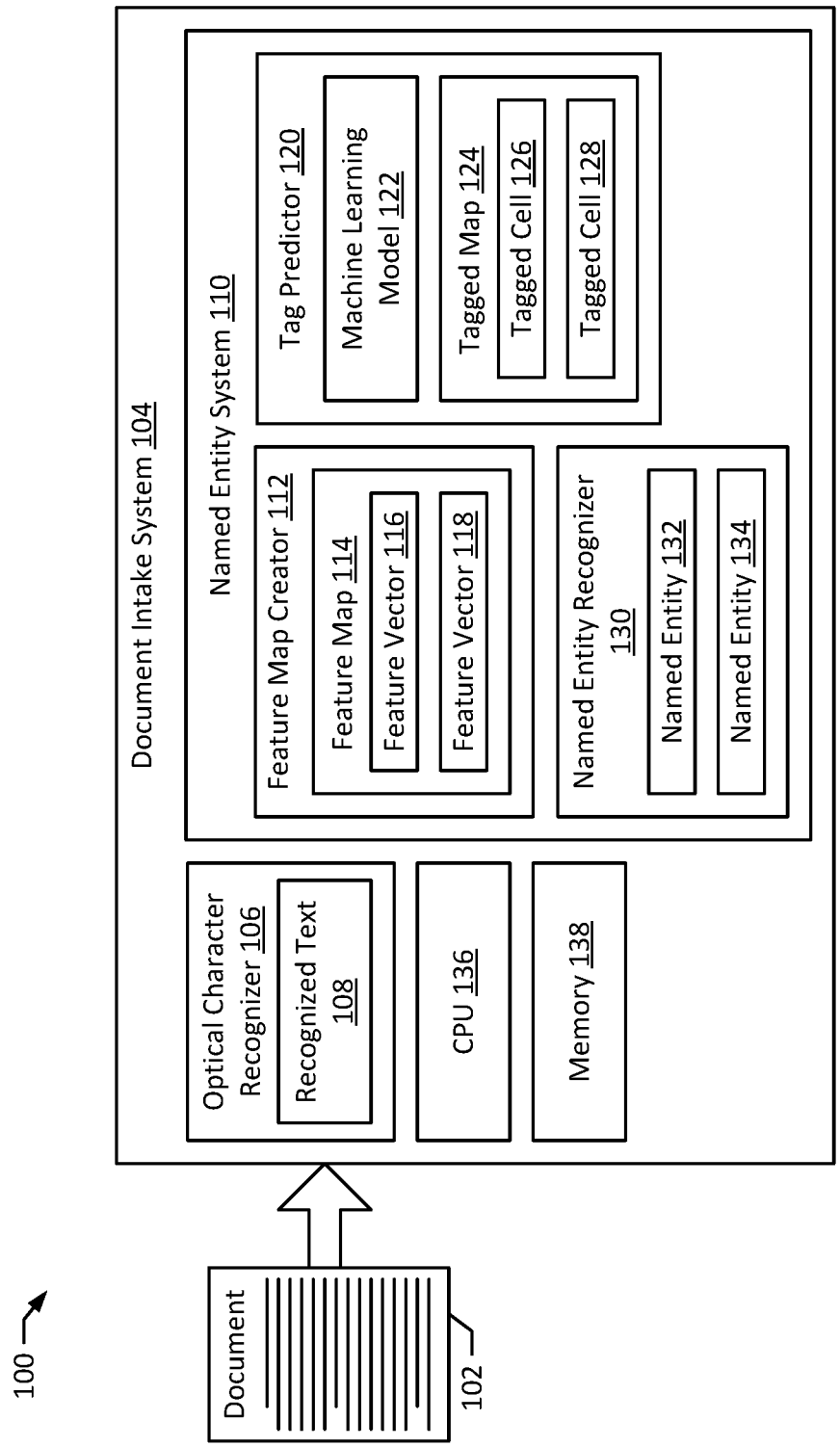
FIG. 1 illustrates a document processing system according to an example embodiment of the present disclosure.

One growing area of automated document processing is the automated analysis of documents, including legal documents. For example, automated tools, such as those from Leverton GmbH, can be used to automate the procedure of reviewing large numbers of contracts, leases, title deeds, and other legal or financial documents during a due diligence process. To automate the analysis of these documents, an important step is to identify named entities in the legal documents. Named entities are textual elements (e.g., words, phrases, or strings) contained within the text of a document identifying information relevant to understanding or interpreting the document. Examples of named entities include proper nouns, including the names of persons or legal entities involved in the transaction embodied in a legal document, such as a party to an agreement, e.g., a landlord, a tenant, a buyer, a seller, a guarantor, mortgagor, mortgagee, lender, guarantor, a licensor, or a licensee. Named entities may also include other information relevant to understanding the transaction embodied in the document, such as addresses or locations, real estate properties, buildings, numbers, dates, and activities. Other examples of named entities may include the names of products or services purchased under an agreement, activities to be performed under an agreement, defined terms in an agreement, and effective dates of an agreement. The types of named entities present in a document may depend on the type of document.

One problem that may be solved through named entity recognition is to find and classify the total invoice amount in a digital invoice document. Identifying the total invoice amount may allow the document processing system to better understand, for example, the terms of an agreement, performance under the agreement, or accounting considerations relevant to a due diligence process. Other examples of named entity recognition may include identifying the parties to an agreement, analyzing other financial documents for pertinent indicators, and analyzing news articles for relevant individuals. In fact, the named entity recognition problem may also exist in application areas outside of document analysis. For example, named entity recognition may be used to better understand any sequence of words, e.g., a transcribed series of words extracted from an audio recording of spoken words.

When recognizing named entities, conventional systems may take as an input multi-word snippets extracted from the text and analyze these snippets for named entities. Because the snippets include multiple words, such conventional systems may be able to take into account contextual information. This contextual information may include information related to words that are near potential named entities. In particular, such contextual information may be important if a particular type of named entity is typically found near certain words or phrases.

However, the multi-word snippet approach used by conventional systems has several drawbacks. First, this method assumes that the text recognized in the document has been brought into the correct reading order, i.e., the recognized words have been ordered in the correct sequence. Occasionally, when recognizing a text of a document, and OCR system may initially recognize the text in a different order than it appeared in the document. This may be particularly common in documents with unusual or non-standard formatting. Therefore, although a text of the document may have been recognized and the words themselves may have been recognized accurately, the string of text containing these words may put them in the wrong order. Therefore, systems that rely solely on multiword text snippets may be unable to account for and correct such errors, resulting in inaccurately-identified named entities.

Second, these conventional systems rely only on sequential multiword snippets of only text, and are therefore unable to incorporate spatial information. In certain scenarios, such spatial information may be particularly important. For example, returning to the invoice amount example discussed above, the invoice document likely includes a tabular portion with relevant figures. Therefore, spatial information derived from the tabular formatting such as the invoice document, such as the relative locations of the words and numbers, may be important for determining whether a particular number corresponds to the total invoice amount. For example, total invoice amounts may typically be found in the bottom right-hand corner of a table. Additionally, such tabular structures may be prone to the above-identified reading order errors from an OCR system. For example, in tables with certain formatting, the OCR system may air and include all of the text labels sequentially before any of the numbers contained in the tables, for example because all of the text labels are contained in the same column on the left-hand side of the page and all of the numbers contained in the table are in a column on the right side of the page. Therefore, a conventional named entity recognition system that relies on multiword snippets may look for the phrase "total invoice" prior to or nearby a number to identify the total invoice amount for the document, which may include the incorrect number if such reading order errors occur.

One innovative procedure, described in the present disclosure, that solves both of these problems, is to create a feature map that includes a grid with multiple cells. A subset of these cells may correspond to portions of the document, such as portions of the document image containing text. Features of the document text may then be calculated and stored at corresponding locations within the feature map. These features may include features of the word or words contained in a corresponding portion of the document. For example, the features may include a text vector representing the text of a word that intersects with a corresponding portion of the document, a location of the word within the document or the corresponding portion of the document, and syntactical information of such interesting words.

Once these features are determined, a machine learning model may analyze the feature map, including the cells that correspond to text of the document, to estimate the location of at least one tag within the document. Named entities of the recognized text of the document image may then be recognized based on the estimated tag location or locations within the document image. In certain implementations, the machine learning model may include a convolutional neural network. The machine learning model may analyze more than one cell (e.g., a region of cells) at the same time to better integrate spatial information, such as which words are located near one another within the document. For example, in determining the above-discussed invoice value, the machine learning model may be better able to determine that a particular number is located at the bottom right-hand corner of a table in the document image by incorporating such spatial information. As discussed above, this location may suggest that the number is the invoice value and may increase the likelihood that the machine learning model correctly identifies the invoice value. Additionally, because the spatial information and relative locations may be incorporated, this technique is less susceptible to errors in the reading order identified by the OCR system and may in fact be totally independent of the reading order in certain implementations. As such, the technique may improve recognition accuracy for named entities within uncommon or difficult to process layouts, such as tables or nested text.

To further improve the accuracy of this method, a machine learning model may be trained by receiving a training document image, a training text from the training document image, and a training feature map for the document image. The machine learning model may analyze the training text, the training document image, and the training feature map to estimate the location of at least one tag within the training feature map, similar to the analysis discussed above in connection with the feature map of the document image. The model may then recognize at least one named entity within the training text based on the estimated location of the tags. Then, the estimated tag locations and/or recognize named entities from the machine learning model may be compared against the known tag locations and/or named entities from the training text. In cases where the machine learning model incorrectly estimates a tag location or inaccurately recognizes a named entity, the parameters of the machine learning model may be updated to improve the model's accuracy at estimating tag locations and/or recognizing named entities.

FIG. 1 depicts a document processing system 100 according to an example embodiment of the present disclosure. The document processing system 100 includes a document 102 and a document intake system 104. The document intake system 104 further includes an optical character recognizer 106, a named entity system 110, a CPU 136, and a memory 138. The optical character recognizer 106 further includes a recognized text 108. The named entity system 110 further includes a feature map creator 112, a tag predictor 120, and a named entity recognizer 130. The feature map creator 112 stores a feature map 114 with two feature vectors 116, 118. The tag predictor 120 includes a machine learning model and stores a tagged map 124 with tagged cells 126, 128. The named entity recognizer 130 stores two named entities 132, 134.

The document intake system 104 may be configured to receive a document 102 and recognize the text within the document 102. The document 102 may be stored on the memory 138 after the document 102 is received by the document intake system 104, before the recognized text 108 is recognized. The document 102 may be received from a document server configured to store multiple documents. The document 102 may be a document image, such as a scanned image of a paper document. In some implementations, if the document 102 is a document image, the document intake system 104 may recognize the text 108. In such a case, the document intake system 104 using the optical character recognizer 106. The optical character recognizer 106 may be configured to perform OCR on the document 102 to recognize a text 108 of the document 102. In other implementations, the document 102 may already have recognized and/or searchable text (e.g., a word document or a PDF with recognized text). In such a case, the document intake system 104 may recognize the text 108 and may instead continue processing the document 102 in the text 108.

The document 102 may be a document of a particular document type. For example, the document 102 may be a lease agreement, a financial document, an accounting statement, a purchase sale agreement, a title insurance document, a certificate of insurance, a mortgage agreement, a loan agreement, a credit agreement, an employment contract, an invoice, a financial document, and an article. Although depicted in the singular, in some implementations the document intake system 104 may be configured to receive and process more than one document 102 at a time. For example, the document intake system 104 may be configured to receive multiple documents of the same type (e.g., accounting statements) or may be configured to receive multiple documents of multiple types (e.g., leases and accounting documents).

The named entity system 110 may be configured to analyze the document 102 and the text 108 in order to identify one or more named entities 132, 134 present within the text 108. For certain documents, or pages within certain documents where standard formatting is involved, the named entity system 110 may utilize conventional methods (e.g., analyzing multiword snippets of the text 108) to identify named entities within the text 108. But, in other instances where a document contains non-standard formatting, or where it is determined that conventional methods are unsuccessful, the named entity system 110 may instead be configured to use feature maps 114 created by the feature map creator 112, to recognize named entities within the document 102. In particular, the feature map creator 112 to create a feature map 114 with M rows and N columns, where at least a subset of the cells formed by the rows and columns individually correspond to a portion of the document 102. For example, where the document 102 is a document image, the feature map 114 may be subdivided into a resolution smaller than the resolution of the document 102. The cells of the feature map 114 may then correspond to those pixels of the document image in the same or similar location of the document image as the corresponding cell's location within the feature map, as explained further below. The feature map creator 112 may then create a feature vector 116, 118 for each of the feature map 114 cells. The feature vector 116, 118 may include a text feature and/or a spatial feature of the text contained within the corresponding portion of the document 102. The specific features included in each feature vector 116, 118 may be selected in accordance with the type of document 102 or subject matter being analyzed. For example, the feature vectors 116 118 may include different features for financial documents as compared to feature vectors 116, 118 created for legal documents. Similarly, selection of the parameters M and N may vary based on the particular document being analyzed, e.g., the resolution of the document 102, the desired accuracy of the named entity recognition for the document 102, performance requirements, and the subject matter of the document 102.

In certain implementations, the technique used to recognize named entities 132, 134 within the document 102 may depend on the document type. For example, the document intake system 104 may be configured to automatically use the feature map 114 and machine learning model 122 as described above to detect named entities 132, 134 within invoice documents, or financial documents. In another example, the document intake system 104 may be configured to use conventional methods to analyze text-heavy documents 102, such as contracts or leases. In still further implementations, the document intake system 104 may be configured to perform both conventional methods and the above-described method involving the feature map 114 and the machine learning model 122 and combine the outputs from each technique. For example, the document intake system 104 may select the output with the highest confidence (i.e., the highest predicted probability for recognized named entities 132, 134). In certain implementations, an additional machine learning model, aside from the machinery model 122, may be used to select between the outputs of each technique.

The tag predictor 120 may be configured to use a machine learning model 122 to analyze the feature vectors 116, 118 of the feature map 114 to estimate the locations of at least one tag within the feature map 114. In doing so, the tag predictor 120 may generate a tagged map 124 containing at least one tagged cell 126, 128. The machine learning model 122 may include, e.g., a convolutional neural network and/or a recurrent neural network. As will be discussed in greater detail below, the tagged map 124 may have the same resolution (i.e., M rows and N columns) as the feature map 114. Similarly, the tagged cells 126, 128 may each correspond to a cell of the feature map 114. As will be discussed in greater detail below, the tagged cells 126, 128 may include an estimated probability that the corresponding cell within the feature map 114 or the associated portion of the document 102 contains a tag or tags. Similarly, the tag predictor 120 may thus estimate to the location of the tags within the document 102 as those locations within the document 102 that corresponds to tagged cells 126, 128 with a high estimated probability of containing a tag. In certain implementations, the tags whose locations are estimated by the tag predictor 120 may correspond to a named entity or named entities 132, 134. For example, each named entity whose location is sought within the document 102 may have a corresponding tag whose location is estimated within the tagged cells 126, 128 of the tagged map 124. In other implementations, the tags may include aspects of the intersecting text that may correspond to a named entity 132, 134. For example, if named parties are being identified as named entities 132, 134 within the document 102, the tags may be selected to identify the location of names or contractual roles within a document 102.

The named entity recognizer 130 may be configured to analyze the tagged map 124 and/or the estimated tag locations within the document 102 to recognize named entities 132, 134 within the recognized text 108. In certain implementations, the named entity recognizer 130 may analyze each word of the text 108 and evaluate the corresponding portions of the tagged map 124 (i.e., the corresponding tagged cells 126, 128) to identify named entities 132, 134. For example, in implementations where the tags whose locations are estimated include tags corresponding to a named entity 132, 134, the named entity recognizer 130 may analyze the tagged cells 126, 128 that correspond to each word of the text 108, and may identify named entities 132, 134 for those words that intersect estimated tag locations within the tagged map 124. In another example, where the tags whose locations are estimated include aspects of the intersecting text, the named entity recognizer 130 may analyze the tagged cells 126, 128 that correspond to each word of the text 108 and may identify named entities where the aspects indicate that the named entity is likely present (i.e., according to predefined heuristics or a machine learning model). For example, if named parties to an agreement are being identified and the corresponding tagged cells 126, 128 indicate that a word or words correspond to an individual's name, and are near the definition of a contractual role within an agreement, the named entity recognizer 130 may identify that a named entity 132, 134 exists that includes both the name and the defined contractual role. In such an example, the named entity recognizer 130 may then collect the name and the role into a single named entity 132, 134. In any of the above-described implementations, the named entity recognizer 130 may combine more than one word within the recognized text 108 into a single named entity 132, 134. In doing so, the named entity recognizer 130 may be configured to combine words with similar tags (i.e., the same tag associated with a desired named entity), or related tags (i.e., a tag associated with a name near a tag associated with a contractual role) that are spatially close to one another. Words that are near one another may be identified using the reading order identified by the optical character recognizer 106 in certain implementations, and may use a measurement of a given word's location within the document 102 (i.e., a position on a page) in other implementations. Additionally, the tags whose locations are estimated may include a tag that indicates there is no named entity predicted at the corresponding portion of the document 102.

As discussed above, the named entities 132, 134 may include information relevant to understanding the text 108 and the document 102, such as persons, organizations, locations, times, dates, quantities, monetary amounts, and required actions. For example, the named entities 132, 134 may include a landlord, a tenant, a buyer, a seller, a party to an agreement, an entity important to the document, and/or a defined term in an agreement. The types of named entities 132, 134 may differ based on the document type corresponding to the document 102. For example, contact information for individuals other than a contract signatory may be less important to a lease contract but may be very important to business procurement contracts. Thus, when analyzing a text 108 deriving from a lease contract, the named entity recognizer 130 may omit recognizing candidate named entities 132, 134 for non-signatory individuals. However, when analyzing a text 108 deriving from a business procurement contract, the named entity recognizer 130 may be configured to recognize candidate named entities 114, 116 for non-signatory individuals. In another example, relevant figures in a financial document may differ depending on the context. This, in certain implementations, the pertinent named entity may include revenue figures and profitability figures in an investment analysis. In other implementations, the important figures may include a count of delivered goods or an amount of money received in exchange for goods in analyzing performance under a purchasing agreement.

In certain implementations, the document 102 may include more than one page. For example, if the document 102 is a document image, the document 102 may include multiple images of the pages of the document 102. In such implementations, the document intake system 104 may analyze each page image individually. In other implementations, the document intake system 104 may analyze multiple pages of the document at the same time. In such implementations, for example, if the machine learning model 122 is implemented as a convolutional neural network, multiple pages may be analyzed by appending the images of each page to be analyzed together into a single image for analysis.

The CPU 136 and the memory 138 may implement one or more of the document intake system 104 features, such as the optical character recognizer 106, the named entity system 110, the feature map creator 112, the tag predictor 120, and the named entity recognizer 130. For example, the memory 138 may contain instructions which, when executed by the CPU 136 may perform one or more of the operational features of the document intake system 104.

Figure 2:
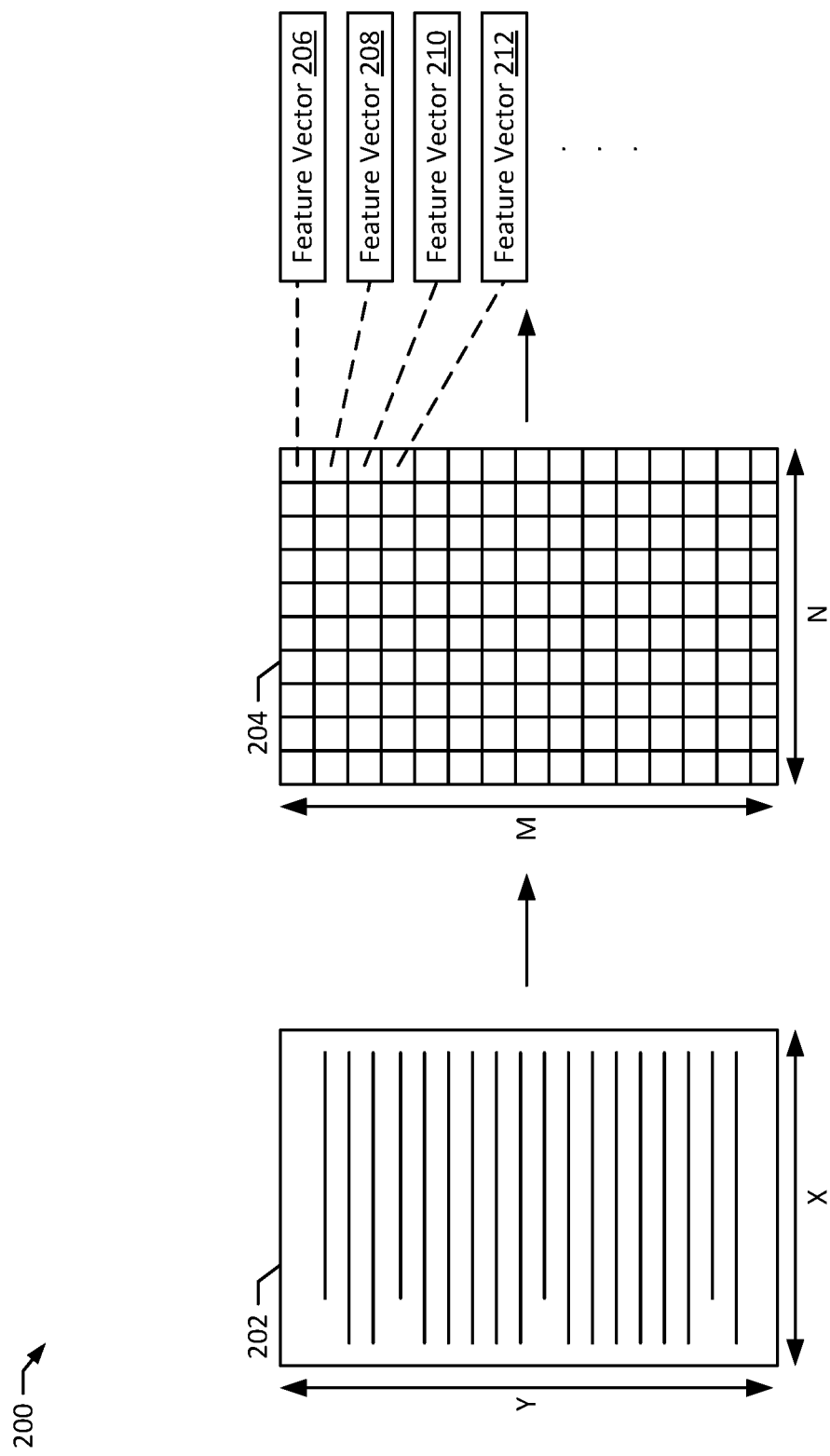
FIG. 2 illustrates a feature map creation operation according to an exemplary embodiment of the present disclosure.

FIG. 2 depicts a feature map creation operation 200 according to an exemplary embodiment of the present disclosure. The feature map creation operation 200 includes a document 202, a feature map 204, and feature vectors 206, 208, 210, 212. The feature map creation operation 200 may be performed by the feature map creator 112. For example, the document 202 may correspond to the document 102, and the feature map 204 may correspond to the feature map 114. Thus, the operation 200 may be used in a named entity recognition procedure to assist in recognizing named entities in the document 202.

While recognizing named entities 132, 134 in the documents 202, the feature map creator 112 may, e.g., at the direction of the named entity system 110, create the feature map 204 corresponding to the document 202. The feature map 204 has M rows and N columns, forming a plurality of cells. The number of rows M and the number of columns N may be selected as a hyperparameter of the named entity recognition process. For example, more rows and columns may be selected to improve recognition accuracy, e.g., where the text is small in size or in applications where accuracy is of greater importance as compared to system performance and processing speed. In another example, fewer rows and columns may be selected to reduce the overall number of cells in the feature map 204 and thereby improve performance and speed in analyzing the feature map 204 and identifying named entities 132, 134. The number of rows M and the number of columns N may therefore differ depending on the document or document type being analyzed.

A subset of the cells of the feature map 204 may correspond to portions of the document 202, e.g., the portions of the document 202 containing the text of the document 202. For example, although the resolution (i.e., M×N) of the feature map 204 may differ from the resolution of the document 202, the number of rows M and the number of columns N may be selected such that the feature map 204 has the same or a similar proportion (i.e., aspect ratio) of the document 202. For example, the number of rows M may be selected such that M is ¼ or ½ or some other fractional proportion of the value of the vertical resolution Y of the document 202. In another example, the number of rows N may be selected such that N is ¼ or ½ or some other fractional proportion of the value of the horizontal resolution next of the document 202. To maintain the same or similar aspect ratios, M and N may be selected so that they are the same fractional value of the vertical and horizontal resolutions of the document 202, respectively. In such implementations, each of the cells of the feature map 204 may correspond to a portion containing a portion of the pixels of the document 202. When fewer rows M and columns N are selected for the feature map 204, each cell of the feature map 204 may correspond to a larger portion (i.e., more pixels) of the document 202.

Next, the feature map creator 112 may create a plurality of feature vectors 206, 208, 210, 212 corresponding to a plurality of the cells of the feature map 204. For example, each feature vector 206, 208, 210, 212 may be associated with one cell or multiple cells of the feature vector 204. For example, the feature vectors 206, 208, 210, 212 may contain features of the documents 202 in the region corresponding to the cells associated with each feature vector 206, 208, 210, 212. These features may include, e.g., text and spatial features of words or text that intersect the corresponding region of the document 202.

The feature map creator 112 may create feature vectors 206, 208, 210, 212 for each cell contained within the feature map 204. In such implementations, the resulting dimensionality of the feature map 204 data structure may have a dimensionality of M×N×V, where V is the number of features included within the feature vectors 206, 208, 210, 212. In such implementations, the feature vectors 206, 208, 210, 202 may be stored as a one-dimensional array of floats, where each entry in the array corresponds to a feature of the feature vector 206, 20 it's, 210, 212. Analogously, although not depicted in FIG. 2, a tagged map 124 generated from the feature map 204 may have a dimensionality of A×B×K, where A is the number of rows in the tagged map 124, B is the number of columns in the tagged map 124, and K is the number of tags whose locations are estimated. In certain implementations, A may be selected to be equal to the number of rows within the feature map 204, M, and B may be selected to be equal to the number of columns within the feature map 204, N. Accordingly, the tagged cells 126, 128 may store a vector that includes estimated probabilities for each of the K tags whose locations are estimated. In certain implementations where at least a subset of the tags are related to at least one named entity, the estimated probabilities for all K tags may sum to 100%, as each tagged cell 126, 128 may only be expected to correspond to a single named entity. In other implementations where the text correspond to aspects of intersecting text, the estimated probabilities may sum to more than 100%, as each tagged cell 126, 128 may possibly correspond to more than one textual aspect.

In other implementations, the feature map creator 112 may only create feature vectors only for those cells corresponding to regions of the documents 202 containing text, e.g., containing words recognized in the recognized text 108 from the optical character recognizer 106.

The feature map 204 and the associated feature vectors may be used by the tag predictor 120, e.g. analyzed by the machine learning model 122, to estimate the probability that each of at least a subset of the cells of the feature map 204 contain tags. These tags may then be used by the named entity recognizer 130 to recognize named entities 132, 134 within the recognized text 108 of the document 102.

Figure 3:
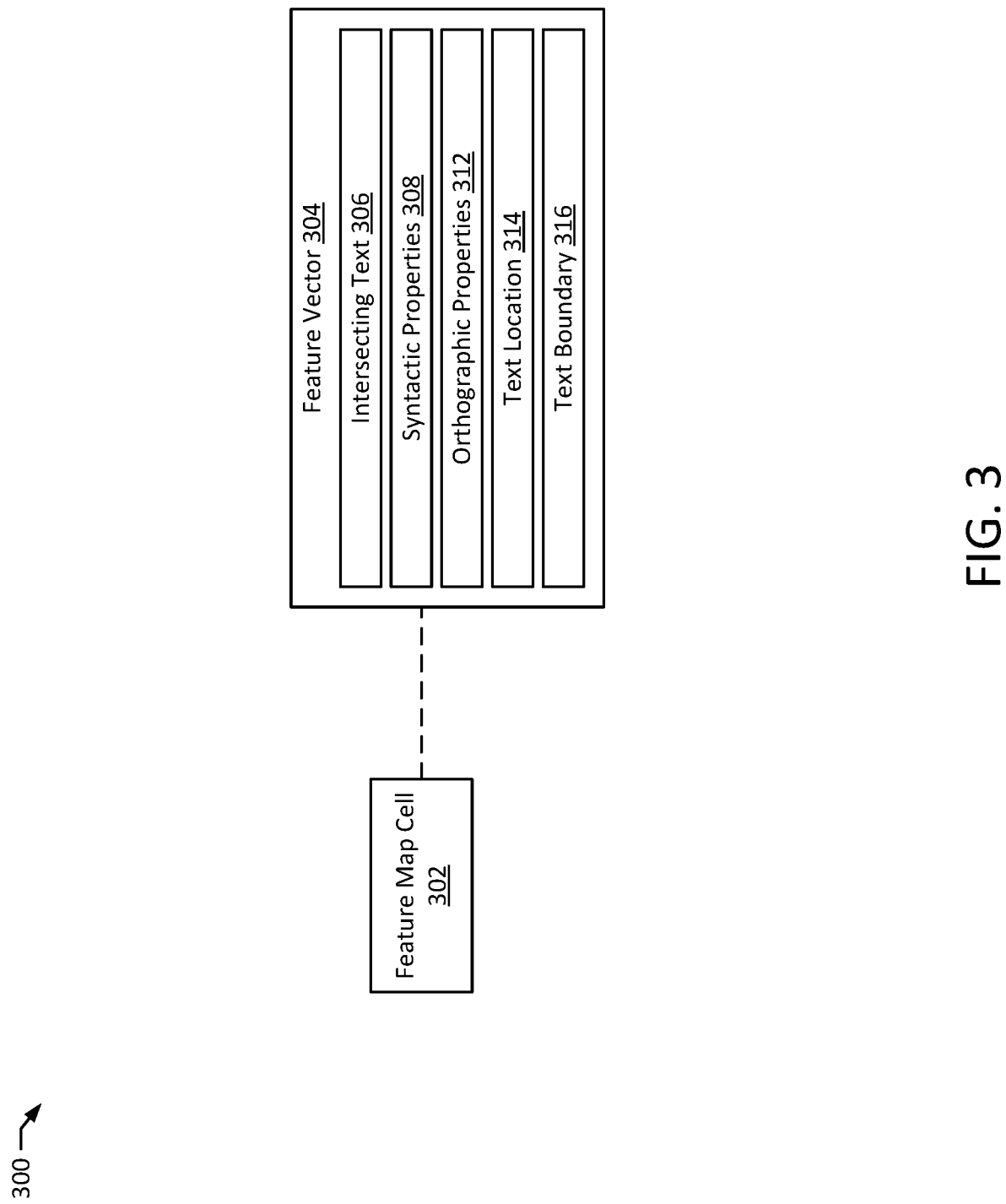
FIG. 3 illustrates a feature map cell—feature vector association according to an exemplary embodiment of the present disclosure.

FIG. 3 depicts a feature map cell—feature vector association 300 according to an exemplary embodiment of the present disclosure. The association 300 includes a feature map cell 302 associated with a feature vector 304. The association 300 may be an example of the association between cells of the feature maps 114, 204 and the feature vectors 116, 118, 206, 208, 210, 212. In particular, the association 300 may be an example of the feature vectors 206, 208, 210, 212, as they are depicted associated with the cells of the feature map 204 in FIG. 2.

As discussed, the feature map cell 302 may correspond to a region of a document 102, 202 (i.e., a pixel or pixels of the document 102, 202). Therefore, in certain cases, the feature map cell 302 may correspond to portions of the document 202, 102 that intersect with or contain part of the text 108. As depicted, the feature map cell 302 is associated with the feature vector 304. In certain implementations, the feature map 114, 204 may be configured such that the feature vector 304 is stored with in the future map cell 302 of the feature map 114, 204. In other implementations, the feature map cell 302 may instead store a reference (e.g., a pointer or other indication of the feature map cell's 302 associated feature vector 304). Further, although the feature vector is depicted as associated with a single feature map cell 302, certain implementations may include feature vectors associated with more than one cell 302.

As mentioned above, the feature vector 304 may be configured to store text features and spatial features of the portion of the document 102, 202 corresponding to the feature map cell 302. For example, the feature vector 304 may be configured to store text features or spatial features of the words or text contained within or intersecting with the corresponding region of the documents 102, 202. As depicted, the feature vector 304 includes text features such as the intersecting text 306, syntactic properties 308, orthographic properties 312, and spatial features such as the text location 314, and the text boundary 316.

The intersecting text 306 may include a transcription or other representation (e.g., a vector) of the words or text intersecting with or contained within the portion of the document 102, 202 corresponding to the feature map cell 302. For example, the intersecting text 306 may include a copy of any words, numerals, symbols, or punctuation that intersect or are contained within the corresponding region of the document 102, 202. In certain implementations, the intersecting text 306 may also reflect any formatting applied to such text, e.g., bolding, underlining, or italicization.

The syntactic properties 308 may include an indication of the typical or associated usage or associated words of the intersecting text 306. For example, the syntactic properties may include an embedded vector, i.e., a word-to-vector representation of a word or words of the intersecting text 306. The embedding vector may include information regarding the semantics of the text, e.g., similar words, commonly associated words, relevant subject areas, word origins. The embedding vector may be provided by a third party and may be stored in a memory 138. The information contained in the embedding vector may assist the tag predictor 120 or the machine learning model 122 in estimating the location of a tag or tags within the feature map 204, 114. For example, in lease agreements, typical named entities may include the landlord and the tenant. However, a particular version of a lease may identify the individuals as "lessor" and "lessee." The embedding vector may indicate that these words are analogous to landlord and tenant and thus assist proper tagging of "lessor" and "lessee" with tags such as legal entity, party to the agreement, landlord.

The orthographic properties 312 may include specific identifiers indicating whether the intersecting text 306 contains certain orthographic features. For example, the orthographic properties 312 may include camel case letters, capitalized words, words with all capitalized letters, words with all lowercase letters, numbers, or symbols (e.g., financial, legal, scientific, or engineering symbols). In certain implementations, the orthographic properties 312 may be stored as a one-hot encoded vector. For example, the orthographic properties 312 may be configured as a vector whose dimension is the same as the number of orthographic properties being identified, where each position within the vector corresponds to a particular orthographic property at issue. In such an example, a particular orthographic property may be identified within the vector as a "1" in the corresponding position, with "0" values stored at the position corresponding to the other orthographic properties. In certain implementations, or for certain documents types, certain orthographic features may indicate a greater likelihood for certain tags. For example, a capitalized word in the middle of a sentence may indicate a proper noun, such as a name or place relevant to the document. Similarly, in legal documents, a capitalized word such as "Landlord" may indicate a reference to a specific party to the agreement or another defined term of the agreement. As another example, in financial documents, numbers used near financial symbols, such as "$," may indicate relevant or important dollar amounts. The orthographic properties 312 may be directly calculated from a string or vector of text (e.g., the intersecting text 306).

The text location 314 may indicate the location of words from the intersecting text 306 within the documents 102, 202. For example, the text location 314 may indicate the location of the intersecting text 306, e.g., the location on a page of the document 102, 302 (such as the page being analyzed), the location within the portion of the document 102, 202 corresponding to the feature map cell 302. For example, if the intersecting text 306 contains more than one word, the text location 314 may separately indicate the location of each word identified in the intersecting text 306 within the corresponding portion of the document image 102, 202. In certain implementations, the text location 314 may be provided as a specific coordinate with in the document 202 or within the corresponding portion of the document. For example, the text location 314 may indicate the pixel corresponding to the bottom left corner of the word. Alternatively, the text location 314 may indicate the region within the document 102, 202 or within the portion of the document 102, 202 containing the word. For example, the text location 314 may indicate the pixels containing the word.

The text boundary 316 may separately indicate the boundary of the text within region within the document 102, 202 or the portion of the document 102, 202 corresponding to the feature map cell 302. Similar to the text location discussed previously, the text boundary may indicate all or a plurality of the pixels constituting the boundary of the text. For example, the text boundary 316 may store indications of each of the pixels comprising the boundary, or may store indications of two or more corners of the boundary, from which the rest of the boundary can be interpolated, e.g., with two coordinates representing pixel locations of the bottom left and top right corners of the intersecting word.

Although not depicted, the features may also include a document type of the document 102, 202, which may be one-hot encoded in the feature vector 304 for each feature cell, similar to the one-hot encoding discussed above in connection with the orthographic properties. Additionally, the features may include confirmed tag information for tags that have already been identified and confirmed within the document 102, 202. The confirmed tag information may assist the machine learning model 122 with identifying new tags in certain instances, as tags may cluster around certain regions of the document 102, 202. Further, the features may include layout information, such as an indication of the presence of ruler lines within the document 102, 202. For example, the presence of ruler lines may be encoded as a four-dimensional vector within the feature vector 304, where each dimension includes a boolean corresponds to one direction (i.e., up, down, left, or right) and encodes if a ruler line is nearby in the given direction. As another example, if the layout information is stored as a 4-dimensional vector, with entries in the vector corresponding to the directions (left, right, up, down), a line below a feature cell may be encoded as (0,0,0,1). In certain document types, (e.g., an invoice) a ruler line below a word may be a strong indication for the presence of a named entity (e.g., a total amount for the invoice).

Using one or both of the text location 314 in the text boundary 316, the tag predictor 120 may infer spatial information about specific words within the text. For example, if the text location 314 and the text boundary 316 include the location of intersecting text 306 within a page of the document 102, 202, it may be possible to determine when words are near one another, even if the reading order of the recognized text 108 is not correct. For example, in determining an invoice value from a tabular text formatted as a table, the reading order may incorrectly list all of the text labels before the associated numerical values. As discussed above, conventional name entity recognition procedures may inaccurately process this because such procedures rely on the reading order from the optical character recognizer 106. But, using the spatial features 314, 316 of a feature vector 304, the named entity system 110 (i.e., the tag predictor 120 and/or the named entity recognizer 130) may be able to accurately determine the labels associated with each numerical value by using the spatial information such as the text location 314 to determine which tags and numbers are near one another within the document 102. Therefore, by including such spatial information 314, 316, it may be possible to account for an incorrectly identified reading order.

In some implementations, the feature vector 304 may be created by a feature map creator 112. In creating the feature vector 304, the feature map creator 112 may analyze the intersecting text 306 to ascertain the features. The feature map creator 112 may also interact with other systems, such as the named entity recognizer 130, to gather features associated with the feature map cell 302. The feature map creator 112 may further interact with external systems, such as an embedded vector provider, to gather features associated with the feature map cell 302. In some implementations, the feature map creator 112 may also create the feature vector 304 at the same time the feature map 104, 204 is created. Certain spatial features, such as the text location 314 within a page of the document 102, 202 may need text 108 that is overlaid over the document 102, 202. However, in other implementations certain portions of spatial information may instead be derived indirectly based on the relative location of the feature map cell 302 within the feature map 114, 204. In fact, rather than expressly calculating a spatial feature 314, 316, subsequent processing may instead derive this information from the feature map cell 302 location. For example, where the machine learning model 122 is a convolutional neural network, such spatial information may be indirectly determined because convolutional neural networks are generally configured to look for local spatial patterns. However, because convolutional neural networks generally identify local patterns, certain documents types (e.g., financial documents) may benefit from the inclusion of an absolute spatial feature 314, 316, such as the location of the corresponding portion of the document 102, 202 on a given page, as certain named entities may be more common in certain areas of the page (e.g., pertinent invoice amounts may be more likely to occur in the bottom-right corner of a document page).

The features included in the feature vector 304 may differ depending on the document 102, 202 or the document type. For example, the features may be selected while training the machine learning model 122, as discussed below, to include the features identified as most relevant to the machine learning model 122 predictions.

Figure 4:
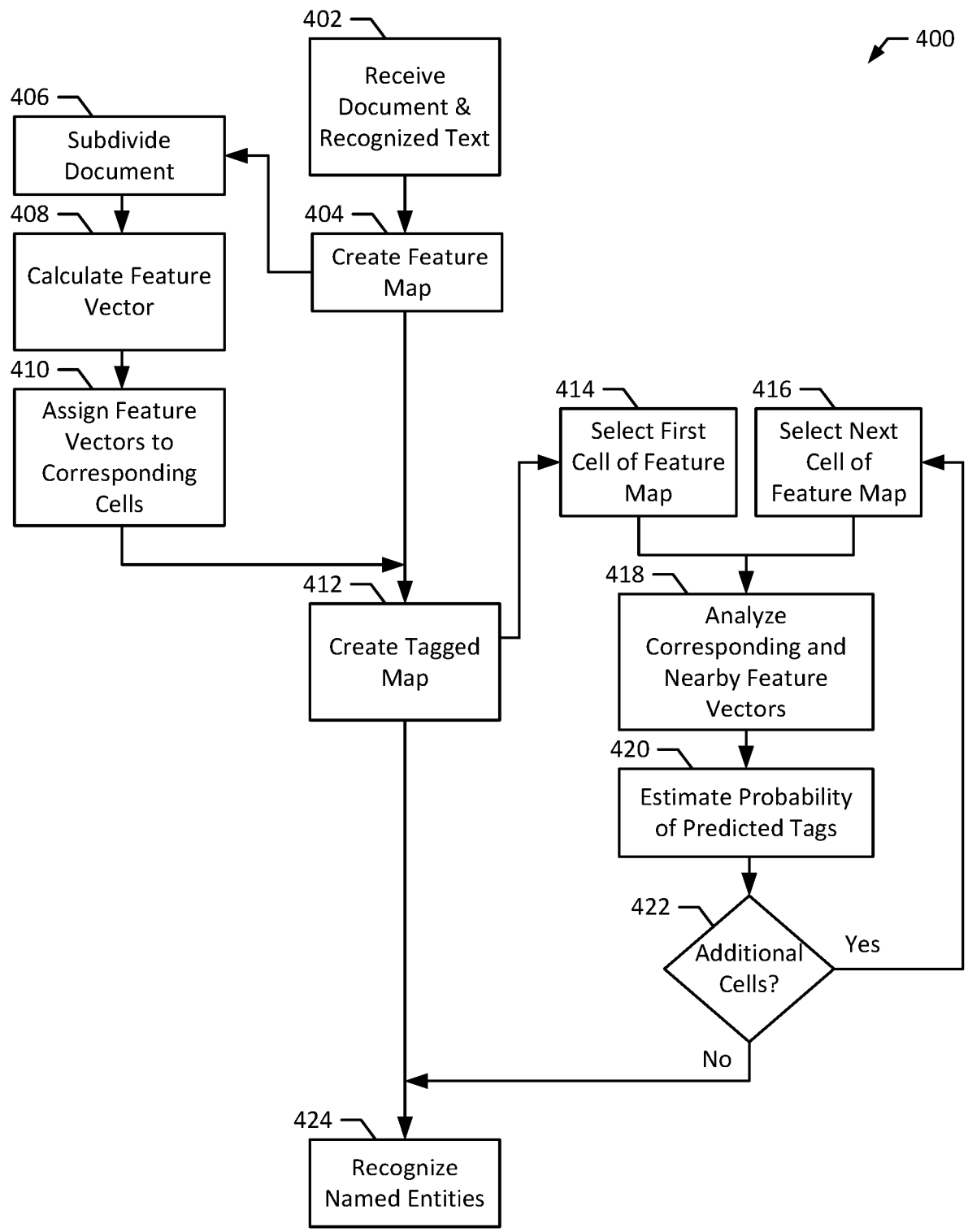
FIG. 4 illustrates a flow chart of a method according to an exemplary embodiment of the present disclosure.

FIG. 4 depicts a flow chart of a method 400 according to an exemplary embodiment of the present disclosure. The method 400, when executed, may be used to create a feature map 114, 204 corresponding to a document 102, 202, to create a tagged map 124 based on the feature map 114, 204, to estimate the locations of a tag or tags within the tagged map 114, 204, and to use the estimated tag locations to recognize named entities 132, 134 within the text 108 of the document 102, 202. The method 400 may be implemented on a computer system, such as the document intake system 104. For example, one or more steps of the method 400 may be implemented by the named entity system 110, including the feature map creator 112, the tag predictor 120, and the named entity recognizer 130. The method 400 may also be implemented by a set of instructions stored on a computer readable medium that, when executed by a processor, cause the computer system to perform the method. For example, all or part of the method 400 may be implemented by the CPU 136 and the memory 138. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with the document intake system 104 receiving a document 102, 202, such as a document image or the image of a page from the document 102, 202, along with a recognized text 108 (block 402). Though a document 102 may be associated with document types that the document intake system 104 is configured to process, as described above. In certain implementations, the document intake system 104 the recognized text 108 may be omitted, in which case the optical character recognizer 106 may perform OCR on the document 102, 202 to recognize a recognized text 108 of the document 102, 202.

The named entity system 110 of the document intake system may then proceed to create a feature map 114, 204 of the document 102, 202, e.g., using the feature map creator 112 (block 404). As described above, the feature map 114, 204 may include a plurality of cells organized into a number of rows M and a number of columns N. Each of these cells may correspond to a portion of the document 102, 202. These cells may include features of the corresponding portion, for example organized into a feature vector.

In certain implementations, to create the feature map at block 404, the feature map creator 112 may begin by subdividing the document 102, 202 into a plurality of rows and columns, i.e., M rows and N columns (block 406). The number of rows M and number of columns N may be selected to improve and optimize the accuracy and/or processing speed. In certain implementations, the number of rows M may be less than the vertical resolution of the document 102, 202 (e.g., ¼ or ½ the vertical resolution) and the number of columns N may be less than the horizontal resolution of the document 102, 202 (e.g., ¼ of ½ the horizontal resolution). The feature map creator 112 may then create a feature map 114, 204 with M rows and N columns of cells. Because the subdivided document and the feature map 114, 204 have the same number of rows and columns, each cell of the feature map 114, 204 may then correspond to the portion of the document 102, 202 at the same row and column. The feature map creator 112 may then calculate a feature vector for each cell based on features of the corresponding portion of the document 102, 202 (block 408). To calculate these features, the feature map creator 112 may step through cells of the feature map 114, 204 and calculate the features based on the text that intersects or is contained within the corresponding portion of the document 102, 202, as described above. For example, in calculating the feature vector 116, 118, 206, 208, 210, 212, 304 for each cell, the feature map creator 112 may identify the corresponding portion of the document and access any portion of the text 108 intersecting or contained within that portion of the document. In certain implementations, the recognized text 108 may be overlaid on the document 102 such that any contained or intersecting text may be identified by determining which portions of the overlaid text 108 are contained within or intersect with the corresponding portion of the document 102, 202. In this fashion, the feature map creator 112 may identify the intersecting text 306, which may be added to the feature vector 116, 118, 206, 208, 210, 212, 304. The feature map creator 112 may calculate syntactic properties 308 of the intersecting text 308, for example, by looking up an embedded vector from an external embedded vector database or embedded vector provider or may be calculated internally within the document intake system 104, for example using a large corpora of text (e.g., a corpora of text collected from websites or publications such as Wikipedia). Orthographic properties 312 of the intersecting text 306 may be calculated by evaluating whether the intersecting text 306 has certain orthographic properties. For example, certain orthographic properties (e.g. capitalized words or financial symbols) may be more indicative of named entities 132, 134 for documents 102, 202 of certain document types. Therefore, in evaluating documents of such document types, the feature map creator 112 may be configured to identify such relevant orthographic properties in the intersecting text 306. To calculate the text location 314 of the intersecting text 306, coordinates (i.e., the bottom left and top right coordinates) of a word or words from the intersecting text 306 may be identified. For example, in the above-discussed implementation where the recognized text 108 is overlaid over the document 102, these coordinates may be identified by determining the pixel locations for the relevant overlaid words of the text 108. Similarly, the text boundary 316 of the intersecting text 306 may be identified by evaluating, for example, the overlaid recognized text 108 to determine the boundaries of the individual words within the intersecting text 306.

The feature map creator 112 may omit calculation of the above-discussed features 306, 308, 312, 314, 316. In particular, certain features may be more or less advantageous for certain documents. For example, in documents 102, 202 that rarely contain tabular or nested text, spatial information 314, 316 may be less essential to accurately identifying named entities 132, 134. In such instances, spatial information may be omitted from the feature vector 116, 118, 304. Similarly, certain syntactic properties 308 may be less relevant to recognizing named entities 132, 134 in documents 102, 202 of a particular document type (e.g., the common contextual usage of certain words may be irrelevant when identifying named entities 132, 134 in financial documents). Therefore, in such implementation, to improve processing time, these aspects may be omitted from the syntactic properties 308 of the feature vector 116, 118, 206, 208, 210, 212, 304. Additionally, the features 306, 308, 312, 314, 316 calculated by the feature map creator 112 may be selected during a machine learning model 122 training phase to include those features 306, 308, 312, 314, 316 most important to the machine learning model 122's operation.

The feature map creator 112 may then assign the feature vectors 116, 118, 206, 208, 210, 212, 304 to the corresponding cells of the feature map 114, 204 (block 410). In certain implementations, the feature map 114, 204 data structure may be configured to store the feature vectors 116, 118, 206, 208, 210, 212, 304 within the corresponding cell of the feature map 114, 204. In other implementations, the feature map 114, 204 data structure may be configured to store a reference within the cells to the corresponding feature vector 116, 118, 206, 208, 210, 212, 304, as described above. Further, in certain implementations, each cell may have its own feature vector 116, 118, 206, 208, 210, 212, 304, while in other implementations cells may share a single feature vector 116, 118, 206, 208, 210, 212, 304. For example, if a word in the intersecting text 306 intersects with portions of the document 102, 202 corresponding to multiple cells of the feature map 114, 204, the cells containing the word may share features or a feature vector 116, 118, 206, 208, 210, 212, 304 related to that word. In additional implementations, cells may lack a feature vector 116, 118, 206, 208, 210, 212, 304. For example, if the feature map creator 112 determines that cells of the feature map 114, 204 correspond to portions of the document 102, 202 without text (e.g., the margins of the documents or other blank regions), the feature map creator 112 may omit calculating a feature vector 116, 118, 206, 208, 210, 212, 304 for such cells. Doing so may reduce both the storage requirements and processing time of the feature map creation process. In certain implementations, blocks 408 and 410 may be performed at the same time. For example, the feature map creator 112 may create each feature vector 116, 118, 206, 208, 210, 212, 304 and assign the feature vector 116, 118, 206, 208, 210, 212, 304 to the corresponding cell in a single operation.

The tag predictor 120 may then estimate the location of tags within the document 102, 202 based on the feature map 114, 204. For example, the tag predictor 120 may analyze the feature map 114, 204 with the machine learning model 122, which may then estimate the locations of the tag or tags. The machine learning model 122 may be configured to analyze each cell of the feature map 204, 114 and estimate a probability that each at least a subset of the cells contains a tag or tags. For example, the machine learning model 122 may analyze the feature vectors 116, 118, 206, 208, 210, 212, 304 of each of the subset of cells and nearby cells to estimate the probability. In certain implementations, the machine learning model 122 may be trained to find patterns within localized regions of cells, e.g., groups of nearby cells. For example, the machine learning model 122 may be configured to analyze each cell and the surrounding eight cells forming a 3×3 grid around the analyzed cell. In still further implementations, the machine learning model 122 may be configured to analyze the entire feature map 114, 204 at the same time in order to identify broader spatial patterns within the document 102, 202 as a whole. In such implementations, it may be helpful to break the document 102, 202 up by individual pages (or smaller groups of pages) and analyze each individually, in order to limit the associated processing power. The machine learning model 122 may accordingly be able to incorporate additional spatial information beyond what is specifically calculated in the feature vector 116, 118, 206, 208, 210, 212, 304. For instance, even if a feature vector 116, 118, 206, 208, 210, 212, 304 does not expressly include nearby words to the cell being analyzed, a machine learning model configured to analyze surrounding cells may determine and incorporate that information from the surrounding cells themselves. In certain implementations, the machine learning model configured to analyze cell regions may be a convolutional neural network. However, other machine learning model 122 implementations are possible, including a recurrent neural network (e.g., a two-dimensional recurrent neural network). In such implementations, the features most important to the successful operation of the machine learning model 122 may include embedding vectors (e.g., syntactic properties 308), orthographic properties 312, and the coordinates of the associated text within the page or pages (e.g., text location 314).

The machine learning model 122 may additionally or alternatively be configured to analyze the feature vectors 116, 118, 206, 208, 210, 212, 304 of each of the subset of cells individually and may estimate the probability that the cell corresponds to a region of the document 102, 202 containing a tag or tags based on the features in the feature vector 116, 118, 206, 208, 210, 212, 304 itself. For example, the machine learning model 122 may analyze the intersecting text 306, the syntactic properties 308, and the orthographic properties 312 corresponding to each of the subset of cells individually and may estimate the probability of the presence of a tag or tags (e.g. a name, a party, an invoice value) in the analyzed cells.

As described in greater detail below, the machine learning model 122 may be trained to identify specific tags or collections of tags, and may be trained to analyze documents 102, 202 of a specific document type. For example, one machine learning model 122 may be trained to analyze legal documents or specific legal documents (e.g., leases or purchasing agreements) and another machine learning model 122 may be configured to analyze financial documents (e.g., invoice values, accounting documents). For this reason, although only depicted in the singular, the tag predictor 120 may include more than one machine learning model 122 and may use the machine learning models to analyze certain documents or to estimate the location of certain tags.

In certain implementations, the tag predictor 120 may only estimate the location of a single tag. For example, the tag predictor may only determine the location of an invoice value within a financial document, or the tenant in a lease agreement, or the sales price in a purchase agreement. Such implementations may be selected to improve processing speeds by focusing only on the most important named entities in a given document 102, 202 or document type. Alternatively, the tag predictor 120 may be configured to estimate the location of tags associated with more than one named entity 132, 134. For example, the tag predictor 120 may be configured to estimate the location of both the landlord and the tenant in a lease agreement, the buyer and seller in a purchase agreement, all named individuals within a news story, all financial figures within an accounting or financial documents, or the name of inventors on a patent application. In certain implementations, the tag predictor 120 may be configured to identify tags that directly relate to named entities 132, 134 (e.g., "landlord," "tenant," "invoice value"). In other implementations, the tag predictor 120 may be configured to predict tags that are indicative of named entities 132, 134, without constituting named entities 132, 134 themselves (e.g., "name," "party to the agreement," "contractual role"). Such an implementation may be used to allow intermediate processing, which may allow the named entity recognizer 130 to combine multiple cells into a single, more detailed named entity 132, 134. Similar to the features calculated for each feature vector, whose locations are estimated by the tag predictor 120 may differ based on document, document type, or other performance considerations. For example, if a faster analysis is needed, the number of predicted tags may be limited to improve processing performance. However, if a more thorough analysis is needed and analysis speed is of minimal concern, more tags may be predicted in order to better inform named entity recognition. For example, the estimated location for each cell may be stored as a vector including the estimated probability or probabilities for the desired tags. In certain implementations, the dimensionality of this vector may be fixed for each application (e.g., each document type). However, it may be possible to add or remove additional tags in response to operational concerns, such as accuracy or processing time. Adding or removing tags may occur in a training process, as discussed below, and may alter the dimensionality of the vector associated with each tagged cell 126, 128 of the tagged map 124.

In certain implementations, the tag predictor 120 may estimate the location of the a tag or tags by first selecting a first cell of the feature map 114, 204 (block 414). For example, with tag predictor 120 may select as the first cell with the top left cell of the feature map 114, 204. Then, the tag predictor 120 may analyze the feature vector 116, 118, 206, 208, 210, 212, 304 that corresponds to the selected first cell. For example, as discussed above, the tag predictor 120 may analyze corresponding and nearby feature vectors 116, 118, 206, 208, 210, 212, 304 (e.g. a 3×3 grid surrounding the selected cell) using the machine learning model 122, such as a convolutional neural network. In analyzing the feature vectors 116, 118, 206, 208, 210, 212, 304 of the feature map, the tag predictor 120 and/or the machine learning model 122 may estimate a probability that cells of the tagged map 124 correspond to portions of the document 102, 202 containing the tag or tags (block 420). For example, the tag predictor 120 may estimate probabilities corresponding to the estimated likelihood that the cells of the tagged map 124 correspond to a portion of the document 102, 202 containing the tag or tags. For example, the tag predictor 120 may estimate a probability for each of the tag or tags in each tagged cells 126, 128 of the tagged map 124. These estimated probabilities may then be stored in a tagged map 124 comprising a plurality of tagged cells 126, 128, e.g., as a vector stored in each tagged cell 126, 128. The tagged map 124 may contain the same number of cells as the feature map 114, 204. In other implementations, if the feature map creator 112 does not calculate a feature vector 116, 118, 206, 208, 210, 212, 304 for each cell of the feature map 114, 204, the tagged map 124 may only predict the tag location probability for the cells of the tagged map 124 that correspond to the same portion of the document 102, 202 as those cells for which the feature map creator 112 calculated a feature vector 116, 118, 206, 208, 210, 212, 304. The tagged cells 126, 128 of the tagged map 124 may store the estimated probabilities and may each correspond to a cell or plurality of cells of the feature map 114, 204. In other implementations, rather than creating a separate tagged map 124, the tag predictor 120 may instead store the estimated probabilities within the feature map 114 itself, for example as a another feature within the feature vectors 116, 118, 206, 208, 210, 212, 304, or as a separate data structure within the cells of the feature map 114, 204. Then, after analyzing the selected first cell, the tag predictor may determine whether there are remaining cells within the feature map 114 that have not yet been analyzed (block 422).

If additional cells remain, processing may then continue with the tag predictor 120 selecting the next cell to be analyzed within the feature map 114, 204 (block 416). In certain implementations, the tag predictor may select as the next cell of the feature map 114, 204 the cell to the right of the previously-analyzed cell and may continue doing so until there are no more cells to the right, at which point to the tag predictor 120 may select the leftmost cell on the next row beneath the currently-analyzed row of cells. In other implementations, where the tag predictor 120 is configured to analyze a group of cells (e.g., a 3×3 grid of cells), the tag predictor 120 may select as the next cell the group of cells to the right of the previously analyzed group of cells. For example, where the tag predictor 120 is configured analyze the 3×3 group of cells, it may select the next 3×3 group of cells to the right. This may take the form of expressly selecting the 3×3 group of cells itself, or selecting the cell at the center of the 3×3 group. Similarly, when there is no longer a group of cells to the right of the previously-analyzed group, the tag predictor 120 may select the leftmost group of cells beneath the row that was previously analyzed. Once the next cell or group of cells is selected, processing may continue through blocks 418 and 420 until there are no additional cells remaining at block 422 (e.g., there are no cells or groups of cells to the right and no remaining rows of cells or groups of cells below to analyze).

The named entity recognizer 130 may recognize named entities 132,134 within the document 102, 202 based on the estimated locations, e.g., the tagged cells 126, 128 of the tagged map 124. For example, the estimated tags may predict a high likelihood that a certain cell corresponds to a portion of the document 102, 202 containing both a name and that the name corresponds to a contractual party within an agreement. Similarly, a nearby cell may be identified as likely containing a defined role within an agreement. Therefore, based on these two nearby tagged cells 126, 128, the named entity recognizer 130 may determine that the tagged call corresponds to a portion of the document 102, 202 containing the name of a contractual party, and may define a contractual party based on the contractual role mentioned in another nearby cell. Similar operations are discussed in greater detail below. In other implementations, the tag may indicate estimated named entity, and the named entity recognizer 130 may create the associated named entity 132, 134 if the estimated probability is high enough (e.g., above 80% or above 90%). The named entities 132, 134 may be indicated as such within the text 108 of the document 102, 202, or may be stored separately, e.g., in a named entity database.

All or some of the blocks of the method 400 may be optional. For example, the method 400 may be performed without executing one or more of blocks 406, 408, 410 in connection with creating the feature map 114, 204 at block 404. Instead, processing at block 404 may continue directly to estimating the location of the tags at block 412. Similarly, the estimation at block 412 need not necessarily be performed by executing one or more of blocks 414, 416, 418, 420, 422. Rather, processing from block 412 may proceed directly to recognizing the named entities at block 424.

FIGS. 5A to 5P depict an example named entity recognition procedure 500 according to an example embodiment of the present disclosure. In some implementations, the procedure 500 may be performed according to a method for creating a feature map 504, estimating the location of a tag or tags within a document 502 based on feature vectors 506, 516, 526, 536, 546, 556, 566 contained within the feature map 504, and recognizing named entities 132, 134 within the document 502 based on the estimated tag locations, such as the method 400. As described in greater detail below, the steps performed in conjunction with the procedure 500 may be performed by the document intake system 104, the named entity system 110, the feature map creator 112, the tag predictor 120, and/or the named entity recognizer 130.

The procedure 500 may begin in FIG. 5A with the document 502. Although similar steps may be used to analyze a document for a page of a document in its entirety, the document 502 as depicted only includes a subset of a page for clarity in presentation. As can be seen, the text of the document 502 names two individuals—John Doe and Max Mustermann—and identifies them respectively as the landlord and the tenant, e.g., under a lease or rental agreement. In certain implementations, a text 108 of the document 502 may be recognized by an optical character recognizer 106 as discussed above. Similarly, as discussed above, the optical character recognizer 106 may inaccurately recognize a reading order of the document 502, making the results of conventional named entity recognition procedures inaccurate and unreliable. Instead, it may be advantageous to create a feature map 504 containing a plurality of cells, each corresponding to a portion of the document 502. As depicted in FIG. 5B, the feature map 502 is superimposed over the document 502 such that the cells of the feature map 504 are depicted with their corresponding portion of the document 502. As can be seen, the feature map 504 includes four rows (A-D) and 27 columns (A-AA). The number of rows and columns may differ from the resolution of the document 502 and may be selected to improve performance or to improve accuracy, as discussed above. In creating the feature map 504, the feature of creator 112 may generate feature vectors 506, 516, 526, 536, 546, 556, 566. The feature vectors 506, 516, 526, 536, 546, 556, 566 may correspond to cells within the feature map 504 and may contain features relating to the text contained within or intersecting with the corresponding portion of the document 502. As depicted, each of the feature vectors 506, 516, 526, 536, 546, 556, 566 correspond to more than one cell of the feature map 504, but corresponds to a single word within the document 502. In other implementations, such as implementations with fewer rows and columns, each cell of the feature map 504 may contain more than one word from the document 502. In such implementations, it may be more common for feature vectors to correspond to individual cells, and for certain feature vectors to correspond to more than one word or for there to be more than one feature vector 506, 516, 526, 536, 546, 556, 566 for each cell corresponding to each intersecting word.

In this example, the feature vectors 506, 516, 526, 536, 546, 556, 566 contain four features: an intersecting text, such as the intersecting text 306, syntactic properties, such as the syntactic properties 308, orthographic properties, such as the orthographic properties 312 and a text location, such as the text location 314. Each of these features may be calculated as discussed above. For example, the factors may be calculated by extracting words contained within corresponding portions of the document 502 and calculating syntactic properties through the use of embedded vectors and calculating predefined orthographic properties. However, unlike the implementations discussed above in connection with the text location 314, the text location in this example instead includes cell designations for the cells containing the words at issue in each feature vector.

Turning to the individual feature vectors, feature vector 506 corresponds to the intersecting text 508 "John" within the document 502, and in particular cells BB-CB within the feature map 504. The syntactic properties 510 indicate that the word "John" from the intersecting text 508 is typically a first name. The syntactic properties may be determined from an embedded vector for "John" which may indicate that "John" is conventionally used as the first name of an individual. Additionally, the orthographic properties 512 indicate that the word "John" has been capitalized. The tag predictor 120 may be configured to identify orthographic properties of the text 508 for each feature vector 506, 516, 526, 536, 546, 556, 566, including whether the text is capitalized, lowercase, in quotations, and a numeral.

The feature vector 516 corresponds to the intersecting text 518 "Doe," and in particular cells DB-EB of the feature map 504. The syntactic properties 520 indicate that the word "Doe" is a last name typically of an individual. The orthographic properties 522 indicate that the word "Doe" is capitalized. In certain implementations, the syntactic properties 520 may also indicate that the word "doe" may also refer also to a deer, namely a female deer. However, the feature map creator 112 may utilize the orthographic properties 522 to clarify that, as this usage of the word "Doe" is capitalized, it is more likely to refer to a last name rather than a deer. Therefore, the feature map creator 112 may determine and only include within the syntactic properties 520 that the word "Doe" is used as a last name.

Feature vector 526 corresponds to the intersecting text 528 "Landlord," and to cells FB-KB of the feature map 504. Although, with in the document 502, the word "Landlord" appears within parentheses and quotations, the feature map creator 112 may be configured to focus only on words contained within the text, and may therefore only include the word "Landlord" within the intersecting text 528 itself and may instead handle other typographic elements within the orthographic properties 532 as appropriate, or as defined previously. The syntactic properties 530 of "Landlord" may indicate that "Landlord" is a legal term common in real estate agreements, which may be gleaned from an embedded vector based on the term "Landlord." As discussed above, the orthographic properties 532 indicate that the word "Landlord" is capitalized, and that it is in quotations. By handling certain typographic elements, such as quotations, within orthographic properties 532 rather than within the intersecting text 528, certain relevant typographic elements may be isolated, thereby improving performance, without incorporating potentially irrelevant typographic elements. Other implementations may instead rely on the training procedure for a machine learning model 122 of the tag predictor 120 to isolate relevant typographic elements and ignore irrelevant typographic elements, without expressly calculating and including them within the feature vector 506, 516, 526, 536, 546, 556, 566.

Feature vector 536, depicted in FIG. 5F corresponds to the intersecting text "and," and to the cells LB-MB of the feature map 504. The syntactic properties 540 indicate that the word "and" is a common English conjunction, which may be determined based on an embedding vector "and." The orthographic properties 542, whose categories may be predefined, indicates that the word "and" is lowercase as it appears within the document 502.

The feature vector 546 includes the intersecting text 548 "Max" of the document 502, which corresponds to the location 554 of cells NB-OB of the feature map 504. The syntactic properties 550 of the intersecting text 548 indicate that the word "Max" is generally used as the first name of an individual. Similarly, the orthographic properties 552 indicate that the word "Max" appears as a capitalized word within the document 502. Similar to "Doe," the word "max" may have another understanding to colloquially refer to a maximum (i.e. a maximum value or maximum amount). However, the feature map creator 112 may use the orthographic properties, namely that "Max" is capitalized within the document 502, to determine that "Max" is used here as a first name.

The feature vector 556 includes the intersecting text 558 "Mustermann" of the document 502, which corresponds to the location 564 of cells PB-UB within the feature map 504. The syntactic properties 560 indicate that "Mustermann" is a last name. Because "Mustermann" is an uncommon word, in certain implementations it syntactic properties 560 for the word may be limited. For example, where syntactic properties 560 calculated using an embedded vector provided by an embedded vector provider, the embedded vector provider may lack an embedded vector for the word "Mustermann." In such cases, the feature map creator 112 may instead attempt to calculate syntactic properties based on other features. For example, the orthographic properties 562 indicate that "Mustermann" is a capitalized word, and the location 564 indicates that it is adjacent to the first name "Max" corresponding to feature vector 546. Therefore, certain implementations may be configured to determine that "Mustermann" is a last name, as it is adjacent to a first name and is also capitalized.

The feature vector 566 includes the intersecting text "Tenant" of the document 502, which corresponds to the location 574 of cells VB-ZB within the feature map 504. The syntactic properties 570 indicate that the word "Tenant" is generally a legal term used in real estate contexts, for example in real estate agreements. The orthographic properties 572 also indicate that the word "Tenant" is capitalized and in quotations. These orthographic properties 572 may indicate, as will be discussed in greater detail below, that the word "Tenant" is used to define a party to an agreement.

As depicted, the feature map 504 includes more cells than those corresponding to feature vectors 506, 516, 526, 536, 546, 556, 566. For simplicity, not all of the calculated feature vectors are reproduced in FIGS. 50-51. For example, the cells BC-WC may include feature vectors with similar features to those discussed above. In certain limitations, the cells of feature vectors that correspond to a portion of the document 502 without any text, for example the cells in rows A and D and columns A and AA, may exclude calculated feature vectors. Other implementations may calculate feature vectors for such cells, but may exclude some of the features, as there is no text included in the corresponding portions of the document 502 for these cells.

The tag predictor 120 may then analyze the feature map 504 and the feature vectors 506, 516, 526, 536, 546, 556, 566 to estimate the location of a tag or tags within the document 502. As discussed above, the tag or tags may be predefined and may depend on the type of document 502 being analyzed and/or performance or accuracy requirements in certain applications. In estimating the locations of the tags, the tag predictor 120 may create a tagged map 124 including a plurality of tagged cells 126, 128. The tagged map 124 may have the same number of rows and columns as the feature map 504, as discussed above, or may have a different number of rows and columns. Additionally, the tagged map 124 may only include tagged cells associated with cells of the feature map 504 that correspond to portions of the document 502 with text. For example, in certain implementations the tagged map may omit tagged cells 126, 128 corresponding to rows A and D and columns A and AA of the feature map 504. In other implementations, such cells may be indicated with a "no entity" tag. In still further implementations, rather than creating a separate tagged map 124, as discussed above, the tag predictor 120 may include the estimations as an entry within the feature map 504, e.g., an entry within the feature vector 506, 516, 526, 536, 546, 556, 566 or within the cell of the feature map 504.

For the purposes of the below example, the tagged map 124 includes the same number of rows and columns as the feature map 504, and uses the same row and column notation. Additionally, it is noted that the tagged cell vectors 576, 578, 580, 582, 584, 586, 588 or indicated as corresponding to multiple cells of the tagged map 124. In certain implementations, a separate tagged cell vector 576, 578, 580, 582, 584, 586, 588 including each estimated tag probability may be calculated for each tagged cell of the tagged map 124. In such instances, the indication that a tagged cell vector 576, 578, 580, 582, 584, 586, 588 corresponds to more than one tagged cell may indicate that the same or similar tagged cell vector 576, 578, 580, 582, 584, 586, 588 is calculated for each tagged cell (e.g., because each corresponding tagged cell of the tagged map 124 corresponds to the same word of the document 102, 202. In other implementations, where multiple cells of the tagged map 124 correspond to the same word of the document 102, 202, a single tagged cell vector 576, 578, 580, 582, 584, 586, 588 may be used for the associated plurality of cells.

FIGS. 5J-5P depict tagged cell vectors 576, 578, 580, 582, 584, 586, 588 corresponding to the above-discussed cells and feature vectors 506, 516, 526, 536, 546, 556, 566. The tagged cell vectors 576, 578, 580, 582, 584, 586, 588 may store multiple forms of predicted tag information related to the corresponding feature vectors 506, 516, 526, 536, 546, 556, 566. For example, the tagged cell vectors 576, 578, 580,

582, 584, 586, 588 may store (i) a predicted probability that the corresponding feature vector 506, 516, 526, 536, 546, 556, 566 intersects with a named entity 132, 134 and (ii) a predicted probability of the type of named entity 132, 134 that is intersected. In implementations where each tagged cell vector 576, 578, 580, 582, 584, 586, 588 corresponds to a single feature vector 506, 516, 526, 536, 546, 556, 566, the tagged cell vector 576, 578, 580, 582, 584, 586, 588 may also store (iii) a predicted probability that the tag cell corresponding to the tagged cell vector 576, 578, 580, 582, 584, 586, 588 intersects with the beginning, middle (i.e., intermediate portion), or end of the named entity 132, 134. In such implementations, the tagged cell vector 576, 578, 580, 582, 584, 586, 588 may combine elements (ii) and (iii). For example, the tagged cell vector 576, 578, 580, 582, 584, 586, 588 may include three separate predicted probabilities for each named entity 132, 134 type: one each for the beginning, middle, and end of the named entity 132, 134. However, for the sake of simplicity in presentation, FIGS. 5J-5P depict an embodiment with a single predicted probability for each intersected named entity 132, 134.

Another potential method, not depicted, for generating the tagged cell vectors 576, 578, 580, 582, 584, 586, 588 may include training the machine learning model 122 to predict a box around the predicted location of each predicted named entity 132, 134, along with a predicted confidence probability that the box corresponds to a particular named entity 132, 134. This predicted box may be larger than the corresponding feature cells, and may have a different aspect ratio. The model may predict more than one box for each named entity 132, 134 and may identify the named entity 132, 134 by selecting the box with the highest predicted confidence probability. This method may be implemented by implementing the machine learning model 122 as a you-only-look-once (YOLO) model. In such implementations, a tagged cell vector may be generated for each predicted named entity 132, 134 location and may include (i) an x-coordinate of the predicted box, (ii) a y-coordinate of the predicted box, (iii) a wide of the predicted box, (iv) a height of the predicted box, (v) a predicted probability of the corresponding type of named entity 132, 134, and (vi) a predicted confidence probability for the predicted box.

The tagged cell vector 576 corresponds to cells BB-CB (i.e. "John"). The tagged cell vector 576 includes estimated probabilities of 90% that "John" corresponds to an individual's name, 5% that "John" corresponds to a contractual party, 5% that "John" corresponds to a contractual role or a role for an individual within an agreement, and 0% that "John" does not correspond to an entity. The probabilities included in the tagged cell 576 may be output from a machine learning model 122, such as a convolutional neural network. As discussed above, the probabilities themselves may be generated by analyzing individual feature vectors 506 as they corresponds to cells within the feature map 504, or by analyzing a plurality of feature vectors 506, 516, 526, 536, 546, 556, 566, each corresponding to cells within the feature map 504. In determining the high probability that "John" corresponds to a name and a contractual party, the machine learning model 122 may rely, for example, on the fact that the syntactic properties 510 indicates that "John" is conventionally used as a name and on the orthographic properties 512 than indicate that "John" is a capitalized word, as names are generally capitalized in text.

Tagged cell vector 578 corresponds to cells DB-EB (i.e., "Doe"). The tagged cell 578 includes estimated probabilities of 90% that "Doe" corresponds to a name, 10% that "Doe" corresponds to a contractual party, 0% that "Doe" corresponds to a contractual role, and 0% the "Doe" does not correspond to an entity. As with "John," the tag predictor 120 may rely on the syntactic properties 520 indicating that "Doe" may be used as a last name, as well as the orthographic properties 522 indicating that it is a capitalized word. In certain implementations, where the machine learning model 122 is configured to analyze multiple feature vectors, the tag predictor 120 may also analyze the feature vector 506 (e.g., the syntactic properties 510 or the orthographic properties 512) of the nearby word "John" to reinforce its estimation that Doe is used as a last name. For example, as "John" is a nearby common first name, the prediction may be stronger that it is a name if Doe were on its own. But, as "Doe" is used after "John," the estimation may be stronger that "Doe" is a last name because it is in close proximity to a term that is very likely used as a first name.

Tagged cell vector 580 corresponds to cells FB-KB (i.e., "Landlord"). The tagged cell vector 580 includes estimated probabilities of 0% that "Landlord" refers to a name, 5% that "Landlord" corresponds to a contractual party, 95% that "Landlord" corresponds to a contractual role, and 5% that "Landlord" does not correspond to an entity. In determining the high likelihood that Landlord refers to a contractual role, the machine learning model 122 or the tag predictor 120 may rely on the fact that the syntactic properties 530 indicate that "Landlord" is a legal term used in real estate agreements and that the orthographic properties 532 indicate that "Landlord" is capitalized and used in quotations. For example, in many agreements, defined terms such as contractual roles are defined as capitalized words within quotations, and many such contractual roles include standard names such as landlord and tenant. Therefore, the machine learning model 122 may determine that similar usage reflects a definition of a contractual role.

Tagged cell vector 582 corresponds to cells LB-MB of the feature map 504 (i.e., "and"). The tagged cell vector 582 includes estimated probabilities of 0% that "and" refers to a name, 0% that "and" refers to a contractual party, 0% that "and" refers to a contractual role, and 100% that "and" does not correspond to an entity. In determining these low estimated probabilities, the machine learning model 122 or the tag predictor 120 may rely on the fact that "and" is a common English conjunction, rather than a name or specialized term common in legal agreements or other applications (e.g., financial applications).

Tagged cell vector 584 corresponds to cells NB-OB (i.e., "Max"). The tagged cell vector 584 includes estimated probabilities of 95% that "Max" refers to a name, 5% that "Max" refers to a contractual party, 0% that "Max" refers to a contractual role, and 0% that "Max" does not refer to an entity. As with tagged cell 576, in estimating the high probability for a name, the tag predictor 120 may use the syntactic property 550 and orthographic property 552 indicating that "Max" is a capitalized word commonly used as a first name.

Tagged cell vector 586 corresponds to cells PB-UB ("Mustermann"). The tagged cell vector 586 includes estimated probabilities of 95% that "Mustermann" refers to a name, 5% that "Mustermann" refers to a contractual party, 0% that "Mustermann" refers to a contractual role, and 0% that "Mustermann" does not refer to an entity. In determining the high probability that "Mustermann" refers to a name, the tag predictor 120 and/or the machine learning model 122 may rely on the syntactic properties 560 indicating that "Mustermann" is a last name and the orthographic properties 562 indicating that "Mustermann" is a capitalized word.

However, as discussed above, "Mustermann" may be an uncommon name, so the syntactic properties 560 may be missing an indication that it is a last name in such environments. Therefore, the tag predictor 120 may also rely on the fact that it is a capitalized word immediately following a common first name to determine that "Mustermann" is likely also a name.

Tagged cell vector 588 corresponds to cells VB-ZB (i.e., "Tenant"). The tagged cell vector 588 includes estimated probabilities of 0% that "Tenant" refers to a name, 5% that "Tenants refers to a contractual party, 95% that "Tenant" refers to a contractual role, and 0% that "Tenants" does not refer to an entity. As with "Landlord" corresponding to tagged cell vector 580, in determining that "Tenant" is likely a contractual role, the tag predictor 120 and/or the machine learning model 122 may rely on the syntactic properties 570 indicating that it is a legal term commonly used in real estate agreements and the orthographic properties 572 indicating that it is a capitalized word in quotations. As discussed above, these properties may indicate a high likelihood that "Tenants" is being used to define a legal term, such as a contractual role within an agreement.

Based on the tagged cells vector 576, 578, 580, 582, 584, 586, 588, the named entity recognizer 130 may recognize named entities 132, 134 within the document 502. For example, tagged cells vector 576, 578, 580 (i.e., "John," "Doe," "Landlord") have been estimated as having high probabilities of including a name (tagged cells vector 576, 578) and a contractual role (tagged cell vector 580). Given that the names "John" and "Doe" are identified close to a likely contractual role "Landlord," the named entity recognizer 130 may determine that the names refer to a first name, last name and contractual role for contractual party, e.g., that John Doe is the landlord under the agreement, and may thus identify a named entity 132, 134 indicating as such. Similarly, given that tagged cells vector 584, 586, 588 (i.e., "Max," "Mustermann," "Tenant") have been estimated as having high probabilities of including a name (tagged cells 584, 586), and a contractual role (tagged cell 588), the named entity recognizer 130 may identify a named entity 132, 134 indicating that Max Mustermann is the tenant under the agreement.

The named entity system 110 may therefore be able to accurately recognize the named entities 132, 134 within the document 502, even if the recognized text 108 from the optical character recognizer 106 includes an incorrect reading order. In particular, the syntactic properties and orthographic properties, coupled with spatial location information may allow the named entity system 110 to accurately associate nearby words with one another and incorporate additional information regarding the usage of the terms.

FIG. 6 depicts a flow diagram of an example method 600 according to an example embodiment of the present disclosure. The flow diagram includes a training system 602, a feature map creator 604, a tag predictor model 606, and a named entity recognizer 608. The training system 602 may be configured to orchestrate the operation of the method 600 and generate updated model parameters based on the outputs generated during the training, as detailed below. In some implementations, the training system 602 may be implemented as part of a named entity system 110 or a tag predictor 120. The feature map creator 604 may be implemented as the feature map creator 112 it may be configured to create a feature map 114, 204, 504 based on a document 102, 202, 502. The tag predictor model 606 may be implemented as the machine learning model 122 of the tag predictor 120 and may be configured to analyze feature vectors 116, 118, 206, 208, 210, 212, 304, 506, 516, 526, 536, 546, 556, 566 of the feature map 114, 204, 504 to estimate the locations of a tag or tags within the document 102, 202. The named entity recognizer 608 may be implemented as the named entity recognizer 130 and may be configured to recognize named entities 132, 134 based on the estimated locations of the tags.

The method 600 may be used to train the tag predictor model 606, which may be associated with the tag predictor 120. Training the tag predictor model 606 may improve the accuracy of the tag predictor model 606 at recognizing estimating the location of a tag or tags within the document 102, 502. Alternatively, training the tag predictor model 606 may allow the tag predictor model 606 to estimate new tanks, or tags located in a new document type. For example, the tag predictor model 606 may be initially trained to recognize tags in business procurement contracts and, after completing the method 600, the tag predictor model 606 may be able to recognize tags in commercial leases. In some implementations, the method 600 may be performed more than once in order to train the tag predictor model 606. In other implementations, the method 600 may only need to be performed once in order to properly train the tag predictor model 606. A machine learning operator, such as an NER system developer, may determine the number of times the method 600 is performed. Alternatively a training system 602 may determine the number of times the method 500 is performed. For example, the training system 602 may repeat the method 600 until the tag predictor model 606 is able to recognize named entities 132, 134 in a document type with a particular level of accuracy.

The method 600 may be implemented on a computer system, such as the document intake system 104. For example, one or more steps of the method 600 may be implemented by the initial named entity system 110, including the feature map creator 112, the tag predictor 120, and the named entity recognizer 130. The method 600 may also be implemented by a set of instructions stored on a computer readable medium that, when executed by a processor, cause the computer system to perform the method. For example, all or part of the method 600 may be implemented by the CPU 136 and the memory 138. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

Additionally, FIG. 6 depicts multiple communications between the training system 602, the feature map creator 604, the tag predictor model 606, and the named entity recognizer 608. These communications may be transmissions between multiple pieces of hardware or may be exchanges between different programmatic modules of software. For example, the communications may be transmissions over a network between multiple computing systems, such as the Internet or a local networking connection. These transmissions may occur over a wired or wireless interface. Other communications may be exchanges between software modules, performed through an application programming interface (API), or other established communication protocols.

The method 600 may begin with the training system 602 creating or selecting a training image and a training text (block 514). The training system 602 may create the training text by using an optical character recognizer 106 to extract text from a document 102. Alternatively, the training system 602 may be connected to or contain a memory that stores training texts and may select one of the training texts for use in training the tag predictor model 606. The training system 602 may create the training text based on the purpose for training the tag predictor model 606. For example, if the tag predictor model 606 is being trained to process a new document type, the training system 602 may create the training text to include text associated with the new document type. In another example, if the tag predictor model 606 is being trained to improve its accuracy, the training system 602 may create a training text that includes particularly difficult portions of text. In the still further example, of the tag predictor model 606 is being trained to identify a new tag, the training system 602 may create a training text that includes the new tag.

The feature map creator 604 may then create a training feature map based on the training image and/or the training text (block 612). Similar to the feature maps 114, 204, 504 discussed above, the training feature map may include M rows and N columns. M and N may be hyperparameters, i.e., designated ahead of time for certain documents or document types. Additionally, as discussed above creating the training feature map may include calculating feature vectors for the cells of the training feature map, wherein the feature vectors may include text features (e.g., intersecting text, syntactic properties, orthographic properties) and spatial features (e.g., text location, text boundary). The features calculated for the feature vectors may be features of the portion of the training document and training text corresponding to the cells of the feature map. In certain implementations, rather than creating the training feature map with the feature map creator 604, the training system 602 may provide a training feature map based on the training image and training text at block 610.

The tag predictor model 606 may analyze the training feature map, the training text, and/or the training image (block 614) and estimate the locations of a tag or tags in the training image and training text (block 616). As discussed above, the tag predictor model 606 may analyze the feature vectors of the training feature map in order to estimate the tag locations. For example, the tag predictor model 606 may analyze the text features for indications of certain tags. In addition, the tag predictor model 606 may analyze spatial information, e.g., to determine which words are located near one another. As discussed in examples above, the tag predictor model 606 may analyze features of cells that are located close together to more accurately estimate tag locations. The tags whose locations are estimated at block 616 may be predetermined according to the document being analyzed, e.g., may be selected based on document type. Also, if the tag predictor model 606 is being trained to recognize a new tag, the new tag may be added to the predetermined tags whose locations are estimated at block 616. In estimating the locations of the tags, the tag predictor model 606 may create, e.g., via a tag predictor 120, a training tagged map containing tagged cells, wherein the tagged cells may include the estimated probability that a corresponding cell of the training feature map includes the tags. In other implementations, the tag predictor model 606 may instead add these estimated probabilities to the cells of the training feature map.

The named entity recognizer 608 may receive the estimated locations of the predicted tags (block 608). For example, the named entity recognizer 608 may receive the tags map or the feature map including the estimated probabilities. The named entity recognizer 608 may then recognize named entities 132, 134 within the training document and the training text based on the estimated probabilities. For example, as discussed above, the named entity recognizer 608 may determine that adjacent tagged cells refer to the same named entity within the documents (e.g., because certain words refer to a name or role), and may collect those tagged cells and their corresponding portions of the training document and training text into a single named entity. In other implementations, the tags themselves may indicate named entities on their own. In such implementations, block 620 may include collecting and adding such tagged cells to the named entities of the training document and/or training text. Other methods discussed above in connection with, e.g., the named entity recognizer 130 may also be utilized by the named entity recognizer 608.

Similarly, after block 616, the training system 602 may also receive the estimated locations of the predicted tags (block 622). These estimated locations may be received in a similar manner as discussed in connection with block 618. The training system 602 may then compare the estimated locations of the tags with a tagged feature map (block 624). For example, the training system may include the tagged feature map, e.g., a pre-tagged map stored in a training database and associated with the training image and/or training text. The tagged feature map may include tag locations within the document 102, 202 that the tag predictor model 606 is intended to identify. For example, the tagged feature map may include the new feature at the tag predictor model 606 is intended to identify in instances where the tag predictor model 606 is being trained to identify a new tag. In other examples, the tagged feature model may include tags that the tag predictor model 606 is already configured to identify in implementations where the tag critic to model 606 is being trained to improve the accuracy. In comparing the estimated locations and the tagged feature map, the training system 602 may identify errors within the estimated locations. For example, the tag predictor model 606 may have failed to identify a tag where one was present within the training image into training text, or may have identified a tag as being located in incorrect location.

After the named entity recognizer 608 recognizes named entities within the training documents and training text, the training system 602 may receive the recognized named entities (block 626). The named entities may be received in a predefined data structure, e.g., a list of named entities contained within the training document and training text. The training system 602 may then compare the recognized named entities with the labeled training text entities (block 628). Similar to the tagged feature map, the labeled training text may be stored in a training database along with a training image and training text and may identify the named entities within the training text which the named entity recognizer 608 was intended to identify. The training system 602 may identify errors in the recognized named entities, where the recognized named entities differ from the labeled training text. For example, the recognized named entities may include a named entity recognized in an incorrect location, or where no such named entity exists in the labeled training text. In another example, the recognized named entities may omit a named entity included within the labeled training text.

After identifying errors in one or both of the estimated tag locations and recognized named entities, the training system 602 may generate updated model parameters (block 630). The updated model parameters may be generated to improve the accuracy of the tag predictor model 606 by, for example, improving the accuracy of the tag predictor model 606 at estimating the location of a tag or tags within a document based on the feature map. The updated model parameters may be generated by, for example, adjusting the weights assigned to particular features of the feature vectors, or by adjusting whether and to what extent the tag predictor model 606 analyzes cells that are nearby one another, rather than individual cells. For example, if the tag predictor model 606 is being trained to identify a tag that is typically associated with only a single word or number (e.g., an invoice amount), the updated model parameters may include a lesser weight on nearby cells, as the invoice amount is more likely to be contained within a single or a small number of cells. In certain implementations, the updated model parameters may also include an adjustment to the number of rows M and a number of columns N that are included within the training feature map created by the feature map creator 604. For example, if one or both of the estimated tag locations and recognized named entities are determined to have too low of an accuracy (e.g., too many missing tag locations and/or named entities, too many falsely-identified tag locations and/or named entities), the number of rows M and/or the number of columns N may be increased to improve the resolution and thereby increase the accuracy, although such adjustments may come with a corresponding decrease in performance as discussed above. Similarly, generating updated model parameters may also include configuring the feature map creator 604 to include additional features in the feature vectors or to remove features from the feature vectors created at block 612. For example, if the tag predictor model 606 is being trained to process a document type with consistent formatting, the feature map creator 604 may be configured to include orthographic properties 312 in the feature vectors of the training feature map, as certain orthographic properties 312 (e.g., capitalization) may be likely to indicate a named entity in such documents given their consistent formatting. The training system 602 may be configured to automatically generate the updated model parameters, or may be configured to have the updated model parameters generated manually, such as by a training system operator or document analyst, or may be configured to generate the updated model parameters both automatically and manually. The tag predictor model 606 may then receive the updated model parameters and be updated to incorporate the updated model parameters (block 538). In certain implementations, the feature map creator 604 may also receive updated parameters, such as updated designations of the number of rows M, the number of columns N, or the features to include in the calculated feature vectors. The method 600 may then repeat again beginning at block 610 to further train the model as discussed above. Similarly, blocks 610-626 may be repeated in whole or in part, e.g., based on multiple training images and training texts, before generating updated model parameters at block 630.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    receiving a document image and a recognized text of the document image;
    creating a feature map of the document image comprising one or more features of the recognized text;
    creating a tagged map including one or more tagged cells;
    estimating, with a machine learning model, one or more locations of a tag in the tagged map; and
    recognizing one or more named entities within the recognized text based on the one or more locations of the tag.

2. The method of claim 1, wherein creating the feature map includes:
    creating the feature map comprising a grid with a plurality of cells, wherein a subset of the cells correspond to portions of the document image; and
    determining, for the subset of the cells of the feature map, one or more features of the recognized text contained in the corresponding portion of the document image.

3. The method of claim 1, wherein the features include a recognized word of the recognized text that intersects a section of the document image, a text feature, and a spatial feature.

4. The method of claim 3 wherein the text feature includes a feature selected from the group consisting of syntactical properties of the recognized word and orthographic properties of the recognized word, and
    wherein the spatial feature includes a feature selected from the group consisting of a location of a recognized word and a boundary of the recognized word.

5. The method of claim 1, wherein estimating the location of one or more predicted tags in the feature map further comprises:
    estimating a probability that one or more of the tagged cells correspond to a portion of the document that contains the tag.

6. The method of claim 1, wherein the recognized text includes a tabular text formatted in a table within the document image, and wherein at least one of the one or more named entities is recognized in the tabular text.

7. The method of claim 1, wherein the recognized text includes a nested texted formatted to be nested beneath another portion of the recognized text, and wherein at least one of the one or more named entities is recognized in the nested text.

8. The method of claim 1, further comprising:
    receiving (i) a training document image, (ii) a training text recognized from the training document image, (iii) a training feature map associated with the training image document, (iv) a labeled tagged map indicating one or more locations of the tag within the training feature map; and (v) a labeled training text indicating one or more named entities located within the training text;
    estimating, with the machine learning model, one or more locations of a tag within a training tagged map;
    recognizing one or more named entities within the training text based on the training tagged map;

comparing the one or more locations of the tag within the training tagged map with the one or more locations of the tag within the labeled tagged map to identify one or more tag errors in the locations of the tag within the training tagged map;

comparing the one or more named entities recognized within the training text with the named entities indicated in the labeled training text to identify one or more named entity errors in the named entities recognized within the training text; and updating one or more parameters of the machine learning model based on one or both of the tag errors and the named entity errors.

9. The method of claim 8, wherein the machine learning model is initially, prior to updating, configured to estimate tag locations in documents of a first document type and the machine learning model estimates tag locations in documents of a second document type using updates of the one or more parameters of the machine learning mode.

10. The method of claim 8, wherein the machine learning model estimates locations of a new tag using updates of the one or more parameters of the machine learning model.

11. A system comprising:
a processor; and
a document intake system comprising a feature map creator, a tag predictor, and a named entity recognizer, wherein the document intake system is configured, when executed by the processor, to:
  receive a document image and a recognized text of the document image;
  create, with the feature map creator, a feature map of the document image comprising one or more features of the recognized text;
  create, with a tag predictor, a tagged map including one or more tagged cells;
  estimate, with a machine learning model, one or more locations of a tag in the tagged map; and
  recognize, with a named entity recognizer, one or more named entities within the recognized text based on the one or more locations of the tag.

12. The system of claim 11, wherein the feature map creator is configured, when executed by the processor, to:
  create the feature map comprising a grid with a plurality of cells, wherein a subset of the cells correspond to portions of the document image; and
  determine, for the subset of the cells of the feature map, one or more features of the recognized text contained in the corresponding portion of the document image.

13. The system of claim 11, wherein the features include a recognized word of the recognized text that intersects a section of the document image, a text feature, and a spatial feature,
wherein the text feature includes a feature selected from the group consisting of syntactical properties of the recognized word and orthographic properties of the recognized word, and
wherein the spatial feature includes a feature selected from the group consisting of a location of the recognized word and a boundary of the recognized word.

14. The system of claim 11, wherein the tag predictor is configured, when executed by a processor, to:
  estimate a probability that one or more of the tagged cells correspond to a portion of the document that contains the tag.

15. The system of claim 11, wherein the recognized text includes a tabular text formatted in a table within the document image, and wherein at least one of the one or more named entities is recognized in the tabular text.

16. The system of claim 11, wherein the recognized text includes a nested texted formatted to be nested beneath another portion of the recognized text, and wherein at least one of the one or more named entities is recognized in the nested text.

17. The system of claim 11, further comprising a training system configured, when executed by the processor, to:
receive (i) a training document image, (ii) a training text recognized from the training document image, (iii) a training feature map associated with the training image document, (iv) a labeled tagged map indicating one or more locations of the tag within the training feature map; and (v) a labeled training text indicating one or more named entities located within the training text;
estimate, with the machine learning model, one or more locations of a tag within a training tagged map;
recognize one or more named entities within the training text based on the training tagged map;
compare the one or more locations of the tag within the training tagged map with the one or more locations of the tag within the labeled tagged map to identify one or more tag errors in the locations of the tag within the training tagged map;
compare the one or more named entities recognized within the training text with the named entities indicated in the labeled training text to identify one or more named entity errors in the named entities recognized within the training text; and
update one or more parameters of the machine learning model based on one or both of the tag errors and the named entity errors.

18. The system of claim 17, wherein the machine learning model is initially configured to estimate tag locations in documents of a first document type and updating one or more parameters of the machine learning model configures the machine learning model to better estimate tag locations in documents of a second document type.

19. The system of claim 17, wherein updating one or more parameters of the machine learning model configures the machine learning model to better estimate locations of a new tag.

20. A non-transitory computer-readable medium storing instructions which, when executed by one or more processors, cause the one or more processors to:
  receive a document image and a recognized text of the document image;
  create a feature map of the document image comprising one or more features of the recognized text;
  create a tagged map including one or more tagged cells;
  estimate one or more locations of a tag in the tagged map; and
  recognize one or more named entities within the recognized text based on the one or more locations of the tag.

* * * * *